United States Patent
Nakamura et al.

(10) Patent No.: US 7,690,834 B2
(45) Date of Patent: Apr. 6, 2010

(54) MIXER AND MIXING METHOD FOR PRODUCING GYPSUM SLURRY

(75) Inventors: Wataru Nakamura, Toyohashi (JP); Yuichi Hirooka, Toyohashi (JP)

(73) Assignee: Yoshino Gypsum Co., Ltd, Tokyo (JP)

( * ) Notice: Subject to any disclaimer, the term of this patent is extended or adjusted under 35 U.S.C. 154(b) by 1089 days.

(21) Appl. No.: 10/558,358

(22) PCT Filed: May 21, 2004

(86) PCT No.: PCT/JP2004/007323

§ 371 (c)(1),
(2), (4) Date: Nov. 25, 2005

(87) PCT Pub. No.: WO2004/103663

PCT Pub. Date: Dec. 2, 2004

(65) Prior Publication Data

US 2007/0008815 A1 Jan. 11, 2007

(30) Foreign Application Priority Data

May 26, 2003 (JP) ............................. 2003-148201
Aug. 29, 2003 (JP) ............................. 2003-209461

(51) Int. Cl.
*B01F 3/12* (2006.01)
*B32B 38/00* (2006.01)
*B01F 7/26* (2006.01)

(52) U.S. Cl. ................. 366/172.2; 366/181.7; 366/304; 156/39

(58) Field of Classification Search ............ 366/6, 366/8, 18, 20, 35, 38, 51, 64, 65, 102, 141, 366/168.1, 171.1, 172.1, 172.2, 181.7, 303, 366/304, 315–317, 96–99, 162.1; 156/39, 156/44
See application file for complete search history.

(56) References Cited

U.S. PATENT DOCUMENTS 2,660,416 A 11/1953 Camp et al.
(Continued)

FOREIGN PATENT DOCUMENTS

JP 53148067 A * 12/1978
(Continued)

*Primary Examiner*—Charles E Cooley
(74) *Attorney, Agent, or Firm*—Jacobson Holman PLLC

(57) ABSTRACT

The present invention provides a mixer and a mixing method which enable stable supply of slurry at a high flow rate with foam being uniformly mixed therein, and which enable reduction in consumption of foam to be fed to the slurry. The mixer (10) has a housing (20), a rotary disc (32), a slurry outlet port (45), a slurry delivery conduit (46) and a hollow connector section (47). A foam feeding port (41) is disposed in a predetermined position of an annular wall or the hollow connector section. The foam feeding port feeds the foam to the slurry, immediately before the slurry enters the slurry outlet port, or feeds the foam to the slurry in the hollow connector section. The slurry and the foam mix with each other at the slurry outlet port or on its downstream side. The foam is not substantially subjected to agitation impact of the mixer and a quantity of loss of the foam is reduced. The foam is uniformly mixed with the slurry even when the flow rate of slurry is increased, and therefore, the production rate of gypsum boards can be increased.

42 Claims, 22 Drawing Sheets

U.S. PATENT DOCUMENTS

| | | | |
|---|---|---|---|
| 3,459,620 A | 8/1969 | McCleary et al. | |
| 5,683,635 A * | 11/1997 | Sucech et al. | 264/42 |
| 6,059,444 A * | 5/2000 | Johnson et al. | 366/172.2 |
| 6,193,408 B1 * | 2/2001 | Miura et al. | 366/304 |
| 6,402,359 B2 * | 6/2002 | Bahner et al. | 366/65 |
| 6,494,609 B1 | 12/2002 | Wittbold et al. | |
| 2004/0062141 A1 | 4/2004 | Shrader et al. | |
| 2006/0045975 A1 * | 3/2006 | Yamaji et al. | 427/355 |
| 2007/0008815 A1 * | 1/2007 | Nakamura et al. | 366/172.1 |

FOREIGN PATENT DOCUMENTS

| | | | | |
|---|---|---|---|---|
| JP | 08 025342 | | | 1/1996 |
| JP | 08025342 | A | * | 1/1996 |
| JP | 8-196890 | | * | 8/1996 |
| JP | 11 501002 | | | 1/1999 |
| JP | 11314219 | A | * | 11/1999 |
| JP | 2000 6137 | A | | 1/2000 |
| JP | 2000262882 | A | * | 9/2000 |
| JP | 2003231116 | A | * | 8/2003 |
| JP | 2004-106439 | | * | 4/2004 |
| WO | WO 97 23337 | | | 7/1997 |
| WO | WO 9967074 | A1 | * | 12/1999 |
| WO | WO 2004103663 | A1 | * | 12/2004 |

* cited by examiner

Peripheral Zone | Inward Zone (A)

| | Specific Gravity of Board Core g/cm³ | Observed Results of Board Core | Consumption of Foaming Agent Effects of Reduction | Flow Rate of Slurry m³/min. | Rate of Production m/min. |
|---|---|---|---|---|---|
| Example-1 | 0.65~0.66 | good | 97 | 1.0 | 115 |
| Example-2 | | good | 95 | 1.0 | 115 |
| Example-3 | | good | 95 | 1.5 | 175 |
| Example-4 | | good | 100 | 1.0 | 115 |
| Example-5 | | good | 100 | 1.0 | 115 |
| Example-6 | | good | 95 | 1.5 | 175 |
| Comparative Example-1 | | good | 60 | 1.0 | 115 |
| Comparative Example-2 | | good | 70 | 1.0 | 115 |
| Comparative Example-3 | | bad (bulging) | 100 | 1.0 | 115 |
| Comparative Example-4 | | good | 100 | 0.8 | 90 |
| Comparative Example-5 | | good | 100 | 0.6 | 70 |

US 7,690,834 B2

MIXER AND MIXING METHOD FOR PRODUCING GYPSUM SLURRY

This is a nationalization of PCT/JP04/007323 filed May 21, 2004 and published in Japanese.

TECHNICAL FIELD

The present invention relates to a mixer, a mixing method and a method of producing gypsum boards, which are used in a continuous slurry pouring and casting type of gypsum board production process.

TECHNICAL BACKGROUND

Gypsum boards are widely used in various kinds of buildings as architectural interior finish materials, because of their advantageous fire-resisting or fire-protecting ability, sound insulation performance, workability, cost performance and so on. The gypsum boards are known as boards having a gypsum core covered with sheets of paper for gypsum board liner. In general, the gypsum boards are produced by a continuous slurry pouring and casting process. This casting process comprises the following steps:

(i) a step of admixing calcined gypsum, adhesive auxiliary agent, set accelerator, foam for reducing a weight, admixtures, additives or the like, with water in a mixer, thereby preparing calcined gypsum slurry (referred to as "slurry" hereinafter);

(ii) a step of pouring the slurry thus prepared in the mixer, into an area between upper and lower sheets of paper for gypsum board liner and forming them in a continuous web-like formation having a configuration of board; and (iii) a step of severing solidified continuous web-like formation, drying it forcibly and thereafter, cutting it to be a product size.

Normally, a thin type of circular mixer is used as a mixer for preparing the slurry. This type of mixer comprises a flattened circular housing and a rotary disc rotatably provided in the housing. A plurality of feeding ports for components to be mixed are located in a center region of an upper plate of the housing, and a slurry outlet port for delivering mixture (slurry) from the mixer is provided in a periphery of the housing. A rotary shaft is connected to the disc to rotate the disc. The upper plate of the housing is provided with a plurality of upper pins (stationary pins) depending therefrom to the vicinity of the disc. The disc is provided with lower pins (movable pins) which are vertically fixed on the disc and which extend to the vicinity of the upper plate. The upper and lower pins are arranged in radially alternate positions. The components to be mixed are supplied on the disc through the respective feeding ports, and are agitated and mixed while being moved radially outward on the disc under an action of centrifugal force, and then, delivered out of the slurry outlet port. The mixer with this arrangement is called a pin type of mixer, which is disclosed in, e.g., US Patent Publication No. 3,459,620.

In general, foam is fed into the mixer for regulating the specific gravity of gypsum board. The importance has been attached to proper mixing of the foam in the slurry, especially in a method of producing lightweight gypsum boards. The following publications are exemplified as prior art intended to achieve effective mixing of foam into slurry:

(1) Japanese Patent Laid-Open Publication No. 8-25342 (Mixer and Mixing Method)

(2) Japanese Patent Laid-Open Publication No. 11-501002 (Method for Preparing Foamed Gypsum Product)

(3) U.S. Patent Publication No. 6,494,609 (Slurry Mixer Outlet)

Further, a relatively large stiff solidified gypsum (residuum) may be fed to the gypsum board liner paper from the mixer. The following publication is exemplified as prior art which is intended to prevent a continuous operation of gypsum board producing apparatus from being unexpectedly interrupted owing to this situation:

(4) Japanese Patent Laid-Open Publication No. 2000-6137 (Mixer and Method of Producing Gypsum Boards with the Mixer)

(1) Japanese Patent Laid-Open Publication No. 8-25342 discloses a mixer and mixing method, wherein quantities of gypsum slurry, which considerably differ in the specific gravity, can be respectively fed to a gypsum board liner paper and so forth by a single mixer. The mixer disclosed in JP 8-25342 comprises a partition wall depending from a periphery of a housing upper plate down to a level close to a rotary disc, in such a way that the inside area of the mixer is divided into two areas (an inward area and a peripheral zone) by the partition wall. In the peripheral zone of the upper plate, there is disposed a foam feeding part, which feeds foam for regulating the volume of slurry for a core of gypsum board (slurry with a low specific gravity). A plurality of slurry fractionation ports are disposed on an annular wall of the housing or the peripheral zone of a housing lower plate, upstream of the foam feeding part as seen in the direction of rotation. Further, a slurry outlet port is disposed on the annular wall or the peripheral zone of the lower plate, downstream of the foam feeding part in the direction of rotation. The fractionation ports and the slurry outlet port can respectively discharge quantities of slurry which differ in the content of foam from each other, and therefore, the quantities of slurry differing in their specific gravity can be supplied to predetermined portions of the gypsum board producing apparatus, respectively. JP 8-25342 also discloses an arrangement in that a second foam feeding section (feeding conduit) is positioned on an upper end portion of a slurry delivery conduit. The slurry delivery conduit is connected with the slurry outlet port by means of a hollow connector section, and it is also called as "vertical chute" or "canister". The slurry in the slurry delivery conduit (slurry for the core) is fed with the foam. With such an arrangement, quantities of slurry differing in their specific gravity can be prepared more efficiently by a single mixer, and the consumption of foaming agent can be reduced.

In accordance with this arrangement of the mixer, it would be possible to supply the gypsum board liner paper with high-quality slurry uniformly mixed with foam, so far as the speed of production (the production rate) of gypsum boards is restricted to be at a relatively low speed so as not to increase the flow rate of slurry. However, it has been found that, as speeding-up of production of gypsum boards is made and the flow rate of slurry is increased, a phenomenon occurs in which the foam and the slurry are not uniformly mixed. That is, if speeding up of production of gypsum boards is made, a desirable mixing condition of the slurry and the foam can not be ensured by the mixer disclosed in JP 8-25342. For instance, phenomenon such as gas pocket of a relatively large size confined to an interface between the gypsum board core and the liner paper covering the core is apt to occur (this defectiveness is known as "bulging"). This is considered to result from separation of slurry and the foam, which is caused in the slurry delivery conduit by effects of the vortex therein, centrifugal force and differing of specific gravity, as described in U.S. Pat. No. 6,494,609.

(2) In Japanese Patent Laid-Open Publication No. 11-501002, an arrangement of mixer is disclosed, in which an insertion point of aqueous foam for regulating slurry volume is properly positioned so as to minimize destruction of foam during mixing. In this mixer, the point of insertion is located, for instance, on an upper plate or an annular peripheral wall in position closer to a slurry discharge outlet than the location of an inlet for calcined gypsum, or located on a slurry discharge conduit connected to the slurry discharge outlet. Further, the mixer in the JP 11-501002 fractionates the slurry for the edge from an outlet different from the slurry discharge outlet, similarly to the mixer disclosed in JP 8-25342 as set forth above, so that the foam for regulating the slurry volume can be fed only to the slurry for core.

However, the mixer in JP 11-501002 does not have a structure corresponding to the slurry delivery conduit, and the slurry for core is directly discharged to the gypsum board liner paper through the discharge conduit. That is, the mixer in JP 11-501002 is so arranged as to immediately discharge the slurry in the mixer to the gypsum board liner paper through the discharge conduit attached to the annular wall of the mixer. For this reason, the foam fed from the foam feeding port on the discharge conduit or its vicinity can not be sufficiently mixed nor dispersed in the slurry when the flow rate of slurry is increased. Therefore, the mixer of this arrangement can run into difficulties when being applied to the speeding up of production rate of gypsum boards.

(3) A centrifugal mixer disclosed in U.S. Patent Publication No. 6,494,609 is provided with an outlet in a tangential direction on an annular wall. An elongated slurry conduit, which is in communication with the outlet opening to an inner area of the mixer, is connected with the mixer. The conduit has a discharge spout for discharging the slurry to a gypsum board forming area. The conduit is provided with a restrictor for creating back pressure so that a slurry filling condition is kept in the mixer by the back pressure. A reducer is provided at the discharge spout of the conduit, so that a slurry discharge pressure is reduced. According to such an arrangement of the mixer, the slurry in the conduit flows in a generally streamline state in the slurry delivery route between the slurry outlet and the discharge spout. The mixer disclosed in U.S. Pat. No. 6,494,609 is intended to provide a mixer for gypsum slurry which does not require use of a canister, taking into account the following points:

① In a conventional mixer with canister (corresponding to the aforementioned "slurry delivery conduit" ), a vortex is caused in the canister, so that an empty air space is created in the canister;

② Since such an air space is formed, solidified gypsum (residuum) is produced in the canister, and this results in clogging of the slurry supply passage;

③ With formation of vortex flow and generation of centrifugal force in the canister, the slurry is pushed against an inner wall surface of the canister. However, the foam tends to stay in a center area of the canister. Therefore, a portion of slurry having a high density unfavorably separates from the foam with a relatively low density (It follows that the canister takes a disadvantageous action from an aspect of uniform mixing of the slurry and the foam.)

In the mixer as disclosed in U.S. Pat. No. 6,494,609, the slurry is conditioned in a streamline flow state in the slurry conduit, and the foam is mixed into the slurry in such a condition. Therefore, the foam and the slurry might be able to be uniformly mixed. From this point of view, the mixer of U.S. Pat. No. 6,494,609 might be applicable to speeding up of gypsum board production. However, an unstable mixing condition of the foam and the slurry may be caused also in this arrangement of the mixer, when a production rate of gypsum boards is raised and the flow rate of slurry in the slurry conduit is increased. Further, as the elongated conduit is used for streamline flow of the slurry, the slurry tends to be adhered to the conduit and a solidified gypsum (residuum) is apt to be produced in the conduit. The growing solid gypsum (residuum) is finally discharged on the gypsum board liner paper together with the slurry. Such a solidified gypsum (residuum) results in a problem of shearing of gypsum board liner paper, which may cause downtime of gypsum board producing process. Therefore, this is an obstacle to continuous operation of the gypsum board producing apparatus. Accordingly, it is necessary for an operator to squeeze the conduit and/or the spout periodically, such as every 15 minutes, in order to prevent adhesion of slurry or growth of the solid gypsum in the conduit, as described in U.S. Pat. No. 6,494,609.

(4) As regards an enlarged and stiff residuum of slurry which may cause a problem of shearing the liner paper, Japanese Patent Laid-Open Publication No. 2000-6137 discloses an arrangement in that such a residuum is restricted in being discharged from the mixer, whereby interruption of continuous operation of the gypsum board producing apparatus is avoidable and gypsum boards can be stably produced. An attachment having openings for screening is located at a slurry outlet port of the mixer. The openings effect filtering of a stiff residuum which has a larger size than the size of opening, and prevent such a residuum from being discharged on the gypsum board liner paper. In this mixer, feeding conduits for powder materials, liquid (water) and foam are connected to an upper plate of the mixer in its inward area, so that the foam introduced into the mixer is fully agitated and mixed with the slurry within the mixer.

The mixer as described in JP 2000-6137 comprises the foam feeding port located on the upper plate in the inward area of the mixer, and therefore, the foam of the slurry is subjected to sufficient agitating action of the mixer so that uniform mixing of the foam and the slurry is obtained. However, this arrangement results in destruction of a relatively large quantity of foam subjected to a strong agitating action, and therefore, the quantity of foaming agent has to be increased, in correspondence with the amount of broken foam. Accordingly, the consumption of foaming agent is increased. As the production rate of gypsum boards is increased, this tendency becomes remarkable, and therefore, this is disadvantageous in cost saving of production.

Thus, when an attempt is made for speeding up of the gypsum board production line, the conventional mixer encounters at least one of the problems in uniform mixing of foam, stable supply of slurry in a high flow rate, and consumption of foaming agent.

It is an object of the present invention to provide a mixer and a mixing method for producing gypsum boards which are adaptable to speeding up in the continuous slurry pouring and casting type of gypsum board production line, which enable stable supply of a high flow rate of slurry uniformly mixed with the foam, and which enable reduction in the consumption of foam to be fed to the slurry.

It is another object of the present invention to provide a continuous slurry pouring and casting type of method for producing gypsum boards, which enables reduction in the consumption of foaming agent and speeding up of production, thereby improving productivity.

DISCLOSURE OF THE INVENTION

The present invention provides a mixer comprising a flattened and circular housing provided with an annular wall on its periphery;

a rotary disc located in the housing to rotate in a predetermined rotational direction;

a slurry outlet port opening on said annular wall to discharge from the housing, gypsum slurry mixed in the housing;

a hollow connector section with an open end connected to said slurry outlet port and another open end connected to a substantially vertical and cylindrical slurry delivery conduit; and a foam feeding port for feeding foam to the gypsum slurry, wherein said foam feeding port is provided on the annular wall on an upstream side of the slurry outlet port in the rotational direction so as to feed the foam to the gypsum slurry immediately before the gypsum slurry enters the slurry outlet port, or provided on said hollow connector section so as to feed the foam to the gypsum slurry flowing in the hollow connector section.

Besides the factor of the quantity of water, the specific gravity of slurry primarily depends on the quantity of foam mixed in slurry. As a precondition for stabilizing the specific gravity, it is necessary to uniformly mix the foam into the slurry. According to the present invention, the foam feeding port opens on the annular wall on the side of the slurry outlet port upstream in the rotational direction of the rotary disc of the mixer (direction opposite to the rotational direction), or opens on the hollow connector section. The foam feeding port feeds the foam from the wall surface of the annular wall to the slurry immediately before the opening of the slurry outlet port, or feeds the foam to the slurry in the hollow connector portion. Conventionally, the foam has been fed from the upper face (upper plate) of the mixer. In the present invention, however, the foam is fed from the circumferential wall or the hollow connector section of the mixer to be mixed with the slurry, and the foam is further mixed with the slurry in the slurry delivery conduit located downstream, whereby the foam can be uniformly mixed with the slurry in a condition of an increased flow rate of the slurry. In addition, the foam is substantially unaffected by impact of agitation of the mixer, so that a quantity of loss of the foam is decreased, and therefore, the consumption of foaming agent can be considerably reduced. Thus, the mixer can continuously supply the slurry uniformly mixed with the foam to a predetermined area, section, equipment and so forth in the gypsum board producing apparatus, even if the flow rate of slurry is increased owing to speeding up of the gypsum board production rate. Such a mixer can uniformly mix the slurry with the foam even in a condition of an increased flow rate of slurry equal to or higher than 1 $m^3$/minute.

Preferably, an inside area of the slurry delivery conduit has a circular transverse cross-section, and the hollow connector section is connected to a position of the slurry delivery conduit eccentric to a center axis of the inside area, so that the gypsum slurry swirls in the inside area. According to such an arrangement, the foam is mixed in the slurry in a condition substantially unaffected by defoaming effect due to impact of agitation in the mixer, and the slurry and the foam are straightened when flowing in the hollow connector section, and then, they flow into the slurry delivery conduit. Owing to the eccentric connection of the hollow connector section, a turning flow or swirling flow of the slurry and the foam is caused in the slurry delivery conduit. The slurry and the foam swirl while gravitationally flowing down in the slurry delivery conduit. Separation of the slurry and the foam due to difference of the specific gravity is restricted, and conversely, the slurry and the foam are uniformly mixed with each other by swirling. Preferably, the hollow connector section causes the slurry to flow into the inside area in its tangential direction, so that the slurry in the inside area swirls in the same direction as the rotational direction of the disc or the direction opposite thereto. It is desired that the rotational direction of the slurry in the inside area is opposite to the rotational direction of the disc. Normally, the slurry delivery conduit is designed to deposit the gypsum slurry on the gypsum board liner paper (lower sheet of paper) conveyed along the gypsum board production line, and it continuously discharges the slurry on the lower sheet. If desired, a spiral guide plate or a restriction is provided within the slurry delivery conduit.

Preferably, the hollow connector section allows the gypsum slurry to flow into the hollow connector section in a tangential direction of the annular wall.

More preferably, the hollow connector section has wall surfaces (47a, 47b) on the sides upstream and downstream in the rotational direction, these wall surfaces forming a slurry passage in the section. The wall surface (47a) on the upstream side is oriented at an angle ranging from 90° to 120° with respect to a normal line (G) of the housing. If desired, the wall surfaces (47a, 47b) on the upstream and downstream sides are located in parallel. More preferably, the wall surface (47b) on the downstream side is positioned at a sharp angle relative to a circumferential inside surface of the annular wall so as to prevent the gypsum slurry in the slurry passage from flowing backward or returning to the peripheral zone (slurry drifting zone) of the mixing area.

In another preferable arrangement, the foam feeding port is positioned in close proximity to the slurry outlet port so as to feed the foam to the slurry immediately before the slurry enters the slurry outlet port. As a kind of mixing means, a plurality of blades are provided, which impose shearing force on the slurry flowing through the slurry outlet port. The blades form a plurality of slits in the slurry outlet port. Preferably, the horizontal or vertical blades having a thickness (t) ranging from 1 mm to 5 mm are arranged at equal intervals to form slits, and a fluid passage dimension (h, w) of the slit between the blades is set to be in a range from 4 mm to 15 mm. The ingredients fed to the mixing area moves outward on the rotary disc under centrifugal force while being agitated and mixed, and the slurry reaches the peripheral zone of the mixing area under a condition whereby the mixing is substantially completed. The foam fed from the foam feeding port to the slurry in the mixer is subjected to the centrifugal force of the mixer to pass through the slits together with the slurry. That is, the foam is fed to the slurry in the peripheral zone at the final stage of preparation of the slurry, and the slurry and the foam undergo strong shearing force so as to be mixed during passing through the slit. As the result of mixing of the slurry and the foam in the slurry outlet port, separation of slurry and the foam due to difference of the specific gravity is restricted, and mixing of the slurry and the foam is rather promoted in the slurry delivery conduit. The dimensions and configuration of the slurry outlet port are usually designed in such a way that it is a rectangle of 100~500 mm in width and 50~100 mm in height. However, the number and configuration of the slurry outlet port can be appropriately designed. For instance, a plurality of slurry outlet ports may be provided on the annular wall. Similarly, the number and configuration of foam feeding port may be appropriately designed. For instance, a plurality of foam feeding ports may be provided on the annular wall.

If desired, an attachment provided with the blades (vanes) and the slits, or an attachment integrally assembled with the blades, the slits and the foam feeding port can be detachably mounted on the annular wall. Desirably, an attachment integrally assembled with the slurry outlet port, the hollow connector section and the slurry delivery conduit is previously furnished, and the attachment is detachably mounted on the annular wall. In use of such an attachment, the attachment can be removed or replaced during maintenance such as cleaning of the slurry outlet port or replacement thereof When the attachment should be replaced with another attachment of different design, involving a change of manufacture condition, change of specification of gypsum board or the like, it is possible to readily mount a replaceable attachment of different design on the mixer. This attachment may differ in dimension or configuration of the slurry outlet port, position of the foam feeding port, existence thereof, and so forth.

The present invention also provides a method of mixing gypsum slurry utilizing a mixer for gypsum slurry, the mixer comprising a flattened and circular housing provided with an annular wall on its periphery; a rotary disc located in the housing and rotated in a predetermined rotational direction; a slurry outlet port opening on said annular wall for discharging from the housing, gypsum slurry mixed in the housing; a hollow connector section with an open end connected to said slurry outlet port and another open end connected to a substantially vertical and cylindrical slurry delivery conduit; and a foam feeding port for feeding foam to the gypsum slurry, comprising:

a first mixing step of mixing powder material and water, which are fed into said housing, in a mixing area within said housing with rotation of said disc to prepare the slurry, and causing said slurry to flow through said slurry outlet port to the hollow connector section; and a second mixing step of feeding the foam to the gypsum slurry from the foam feeding port, which is located on the annular wall on an upstream side of the slurry outlet port in the rotational direction so as to feed the foam to the gypsum slurry immediately before the gypsum slurry enters the slurry outlet port, or which is located in the hollow connector section so as to feed the foam to the gypsum slurry in the hollow connector section, and imposing shearing force on the slurry and the foam at said slurry outlet port or on its downstream side so as to mix the slurry and the foam.

The mixing method of the present invention comprises a step for slurry preparation in the mixing area (the first mixing step) and a step for feeding and mixing of the foam to the slurry (the second mixing step). The foam is fed to the slurry in a route of slurry from the peripheral zone via the slurry outlet port to the slurry delivery conduit, and the slurry is subjected to shearing force so that it is to be mixed with the foam, immediately after supply of the foam. The foam is mixed into the slurry without influence of defoaming effect due to agitation impact of the mixer, and mixed with the slurry at the slurry outlet port or downstream thereof. Therefore, the required consumption of foaming agent can be considerably reduced. Further, the foam is uniformly mixed with the slurry in the second mixing step, and therefore, the flow rate of slurry can be increased.

Preferably, the foam is fed to the slurry immediately before or immediately after the slurry flows through the slurry outlet port. The fluid of the slurry and the foam eccentric to the inside area of the slurry delivery conduit having a circular transverse cross-section flows into the inside area in a tangential direction thereof, so that the slurry and the foam swirl in the inside area. The slurry and the foam are mixed with each other by shearing force acting on the slurry during swirling.

As another preferable arrangement, a plurality of blades forming a plurality of slits are disposed in the slurry outlet port, and the foam is fed to the slurry immediately before the slurry passes through the slits so that the slurry and the foam are mixed with each other by shearing force acting on the slurry passing through the slits.

These mixing steps may be simultaneously employed. In such a case, the slurry and the foam are mixed by shearing force acting on the slurry passing through the slits, and further mixed by shearing force acting on the slurry during swirling.

The present invention provides a method of producing gypsum boards with use of the mixer as set forth above, wherein gypsum boards having a thickness of 9.5 mm and a width of 910 mm (JIS A6901) are produced at a production rate equal to or higher than 110 m/minute. This speed of production approximately corresponds to a production rate equal to or higher than 85 m/minute, with respect to gypsum boards which have a thickness of 12.5 mm and a width of 910 mm (JIS A6901).

The present invention also provides a method of producing gypsum boards with use of the mixer as set forth above, wherein the gypsum slurry at a flow rate equal to or higher than 1 $m^3$/minute is fed between the sheets of gypsum board liner paper passing through forming means.

According to the present method of producing gypsum boards, productivity of lightweight gypsum boards is considerably improved, and therefore, significant and useful effects can be obtained particularly in production of lightweight gypsum boards.

BRIEF DESCRIPTION OF THE DRAWINGS

FIG. 27 is an illustration by tables, which shows results of tests of examples-1 to 6 and comparative examples-1 to 5 with respect to a mixing state of foam in slurry, a consumption rate of foaming agent and a production rate of gypsum boards.

BEST MODE FOR CARRYING OUT THE INVENTION

With reference to the attached drawings, preferred embodiments of the present invention are described hereinafter.

Figure 1:
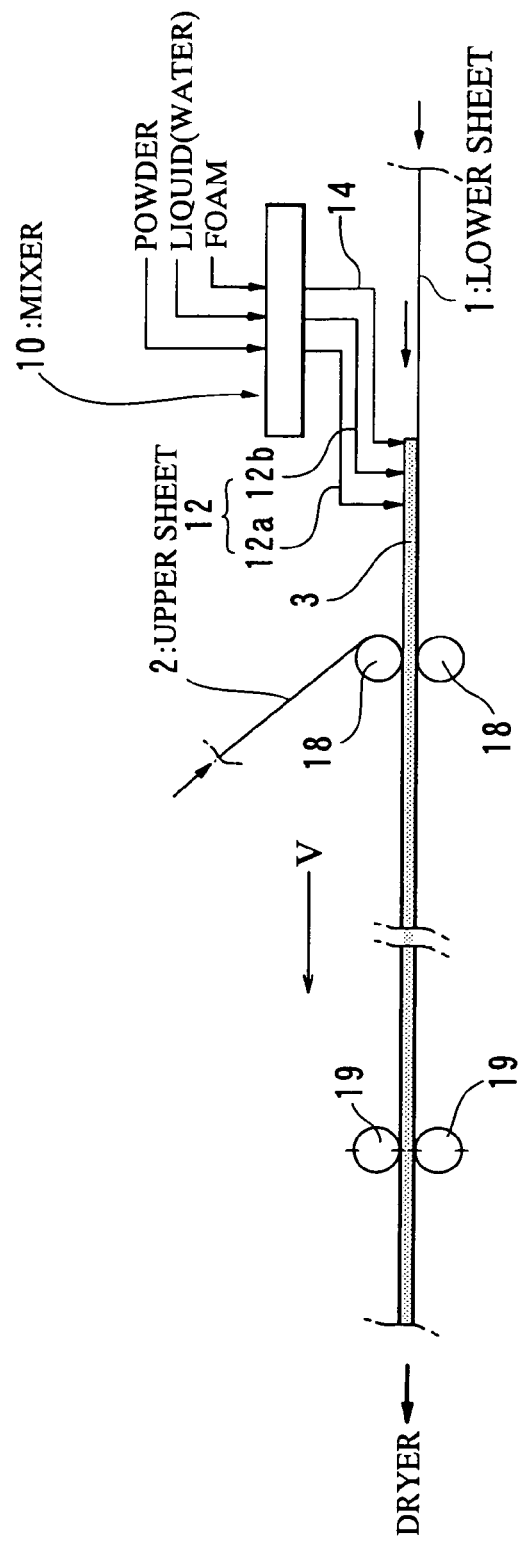
FIG. 1 is an explanatory view schematically illustrating a forming process of gypsum boards.

FIG. 1 is an explanatory view partially and schematically illustrating a forming process of gypsum boards.

A lower sheet of paper 1 for a gypsum board liner is conveyed along a line of production. A mixer 10 is located in a predetermined position in relation to a conveyance line, e.g., in a position above the conveyance line. Powder materials (calcined gypsum, adhesive agent, set accelerator, additives, admixture and so forth), foam and liquid (water) are fed to the mixer 10. The mixer 10 mixes these materials and discharges slurry (calcined gypsum slurry) 3 onto the sheet 1 by means of conduits 12 (12a, 12b), 14. The conduit 14 is positioned so as to discharge the slurry 3 on a widthwise center area of the sheet 1. The conduits 12a, 12b are positioned so as to discharge the slurry 3 on widthwise end portions (edge zones) of the sheet 1 respectively.

The sheet 1 is transferred together with the slurry 3 to reach a pair of forming rollers 18, 18. An upper sheet of paper 2 travels partially around a peripheral surface of the upper roller 18 to be diverted toward a conveyance direction. The diverted upper sheet 2 is brought into contact with the slurry 3 on the lower sheet 1 and transferred in the conveyance direction substantially in parallel with the lower sheet 1. A continuous three-layered formation constituted by the sheets 1,2 and the slurry 3 is formed on a downstream side of the rollers 18, 18. This formation runs continuously at a conveyance velocity V while setting the slurry 3, and it reaches cutting rollers 19, 19. A variety of forming ways with use of alternative means, instead of the forming rollers 18, 18, may be employed, e.g., a forming way with use of an extruder, or a forming way of causing the formation to pass through a gate with a rectangular opening.

The cutting rollers 19, 19 sever the continuous formation into boards of a predetermined length, so as to make boards having a gypsum core covered with gypsum board liner papers, i.e., green boards. Then, the parts of formation thus severed (green boards) are charged into a dryer for forced drying therein, and thereafter, they are cut to a predetermined product length. Thus, gypsum board products are successively produced.

Figure 2:
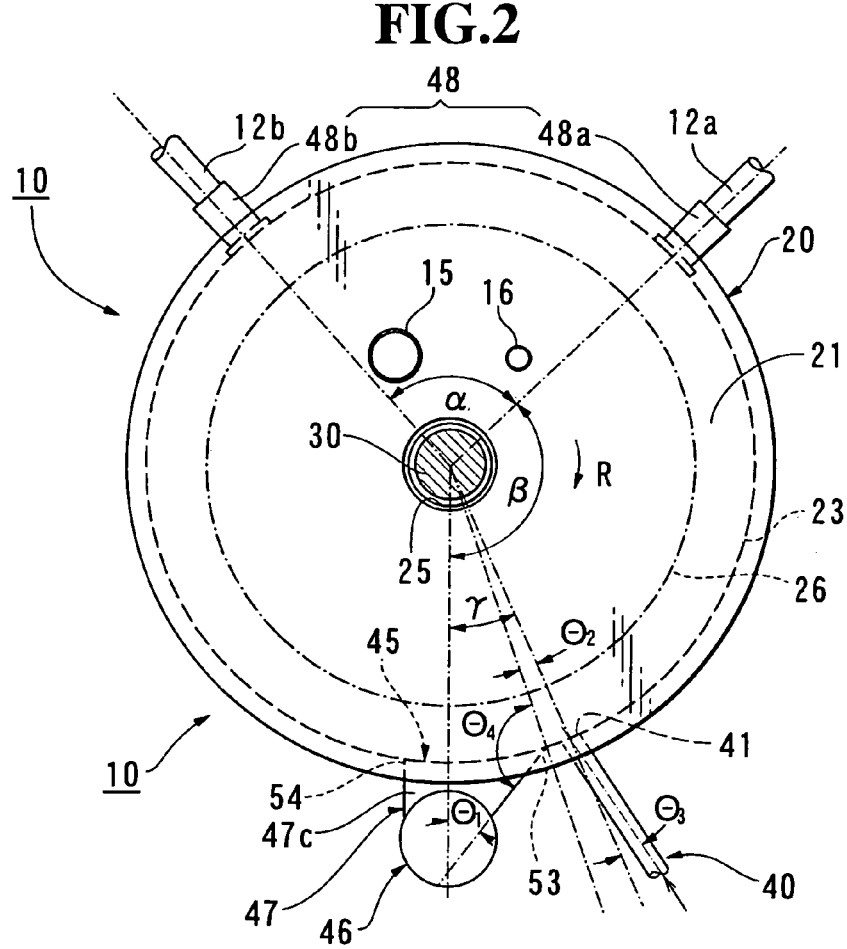
FIGS. 2 and 3 are a plan view and a perspective view of a mixer showing a first embodiment according to the present invention.
Figure 3:
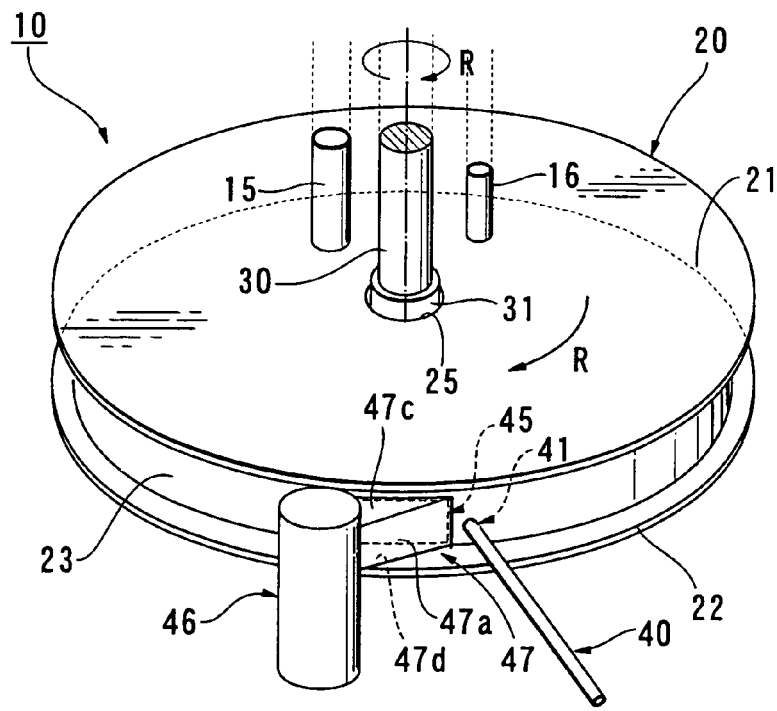
Figure 4:
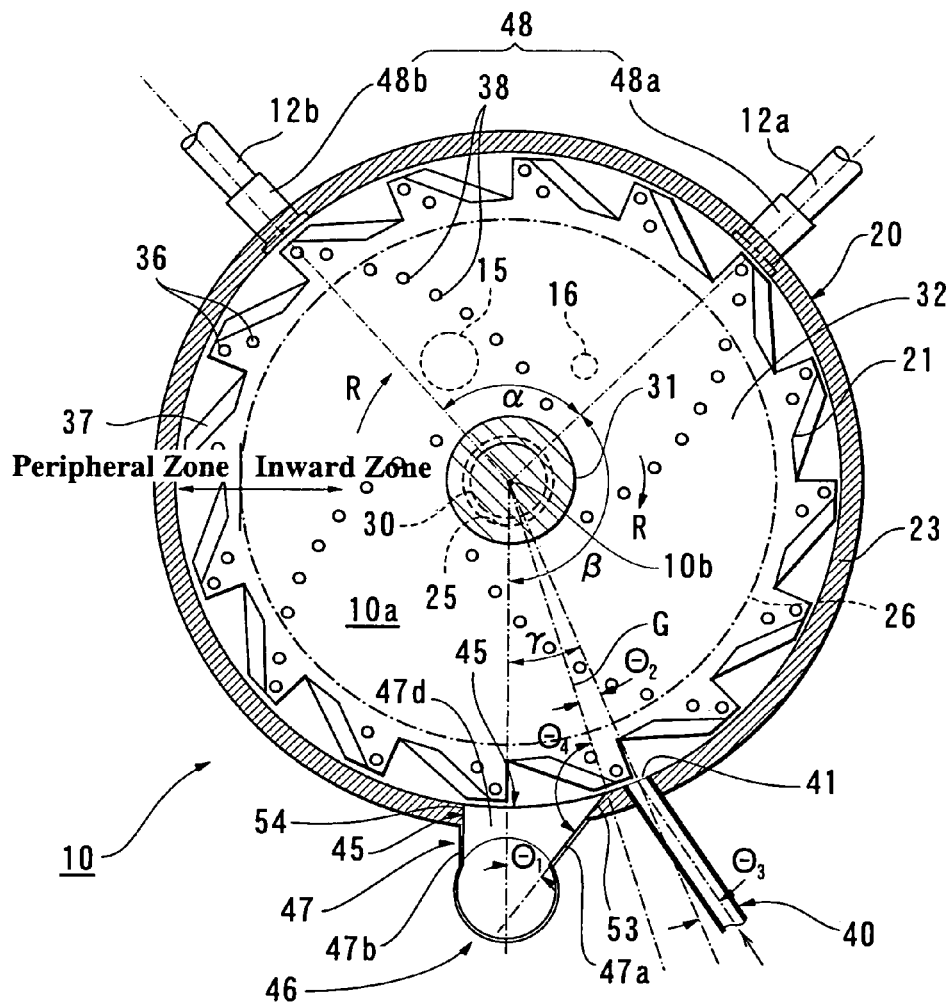
FIGS. 4, 5 and 6 are a transverse cross-sectional view, a vertical cross-sectional view and a fragmentary sectional perspective view which show an internal structure of the mixer.
Figure 6:
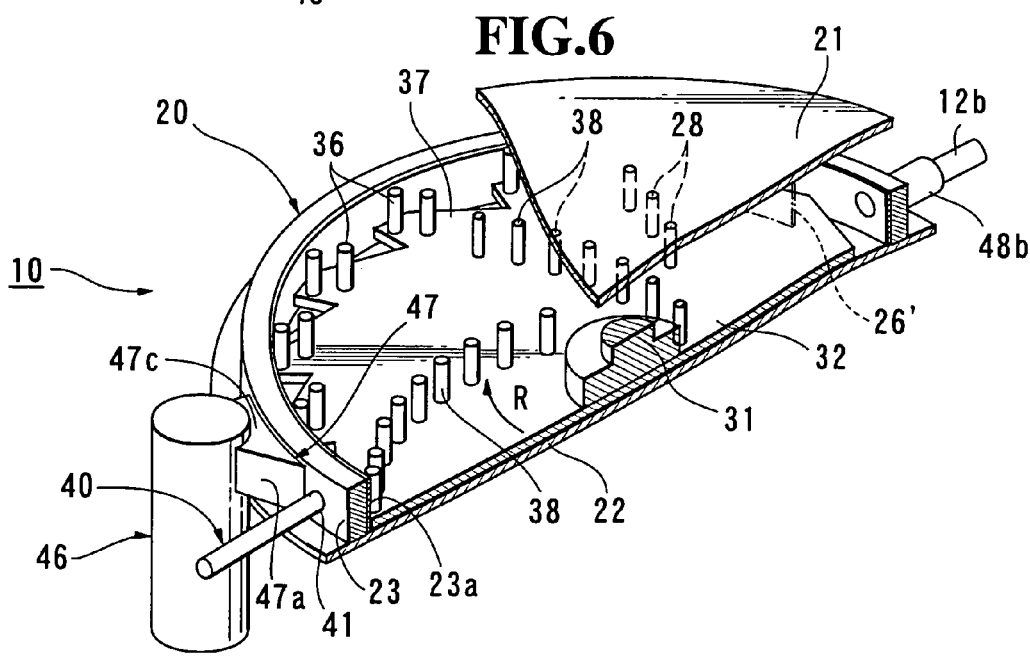
Figure 5:
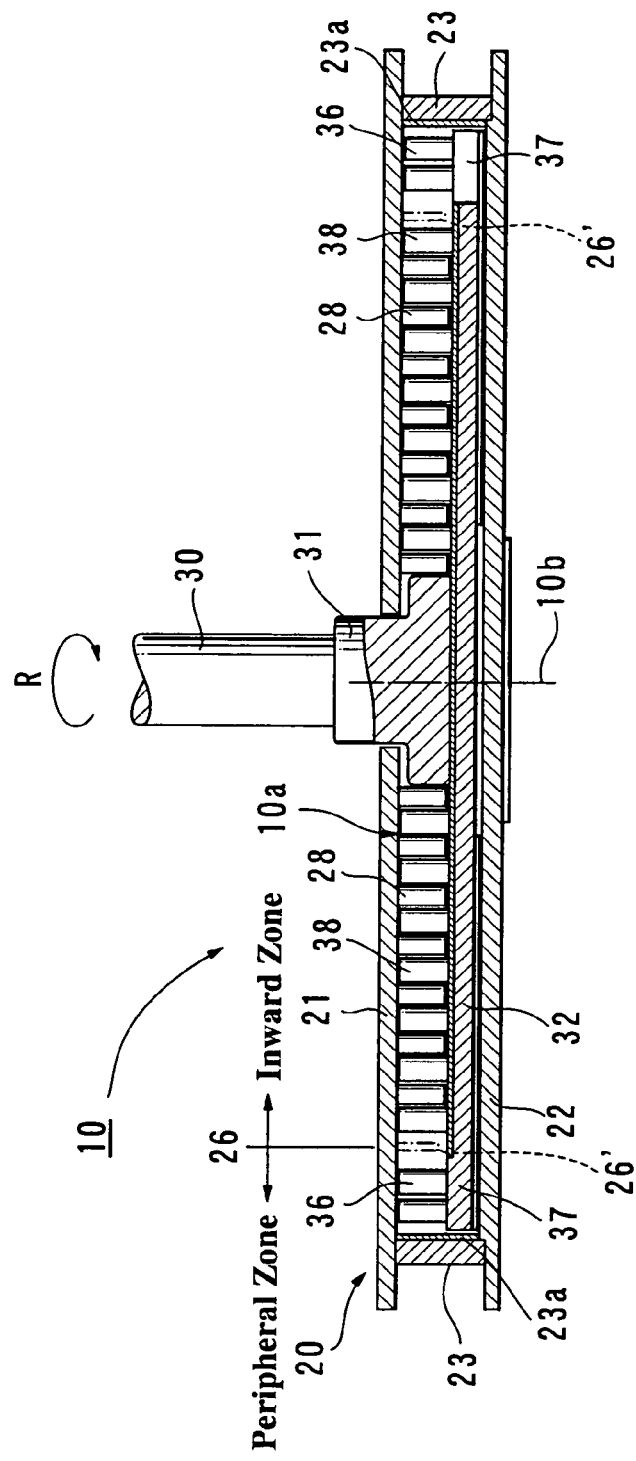

In FIGS. 2 to 6, there is shown the mixer of a first embodiment according to the present invention. FIGS. 2 and 3 are a plan view and a perspective view generally showing the mixer 10, and FIGS. 4, 5 and 6 are a transverse cross-sectional view, a vertical cross-sectional view and a fragmentary sectional perspective view which show an internal structure of the mixer 10.

As shown in FIGS. 2 and 3, the mixer 10 has a flattened cylindrical housing or casing 20 (referred to as "housing 20" hereinafter). The housing 20 has a horizontal and round upper plate or top cover 21 (referred to as "upper plate 21" hereinafter), a horizontal and round lower plate or bottom cover 22 (referred to as "lower plate 22" hereinafter), and an annular wall or outer peripheral wall 23 (referred to as "annular wall 23" hereinafter) which is positioned in peripheral positions of the upper and lower plates 21, 22. The plates 21, 22 are positioned, vertically spaced apart at a predetermined distance, so that a mixing area for mixing the power materials and liquid (water) is defined in the mixer 10. A circular opening 25 is formed at a center part of the upper plate 21. An enlarged lower portion 31 of a rotatable vertical shaft 30 extends through the opening 25. The shaft 30 is connected with rotary drive means, such as an electric drive motor (not shown), and driven in rotation in a predetermined rotational direction (clockwise direction R as seen from its upper side, in this embodiment). If desired, a variable speed device, such as a variable speed gear mechanism or belt assembly, may be interposed between the shaft 30 and an output shaft of the rotary drive means.

A powder supply conduit 15 for feeding the powder materials to be mixed is connected to the upper plate 21. A water supply conduit 16 for supplying a quantity of mixing water is also connected to the upper plate 21. If desired, an internal pressure regulator (not shown) for limiting excessive increase of internal pressure and so forth may be further connected to the upper plate 21.

A foam feeding conduit 40 is connected to the annular wall 23. A foam feeding port 41 of the conduit 40 opens on a circumferential inside surface of the annular wall 23. A quantity of foam for regulating the volume of slurry is supplied to the constituents of mixture in the mixer 10 by the conduit 40. A slurry outlet port 45 is formed on the annular wall 23. The port 45 is positioned on a downstream side of the port 41 in the rotational direction. The port 45 opens on the circumferential inside surface of the annular wall 23 in close proximity to the port 41.

An enlarged open end of a hollow connector section 47 is connected with an edge of opening of the slurry outlet port 45. The section 47 extends outward from the annular wall 23. A reduced open end of the section 47 is connected with an upper end portion of the slurry delivery conduit 46.

On an opposite side of the conduit 46, fractionation ports 48a, 48b are provided on the annular wall 23. The conduits 12a, 12b are connected to the ports 48a, 48b, respectively. The ports 48a, 48b are positioned, spaced at a predetermined angle α from each other. Inlet ports of the powder supply conduit 15 and the water supply conduit 16 open within a range of the angle α in a center region of the upper plate 21, respectively.

As shown in FIG. 4, the slurry outlet port 45 is positioned on the annular wall 23, spaced at a predetermined angle β from the fractionation port 48a in the rotational direction R. The foam feeding conduit 40 is connected to the annular wall 23 within a range of the angle β. The foam feeding port 41 is positioned on an upstream side of the port 45 in close proximity thereto. The conduit 40 feeds a predetermined quantity of foam to the slurry which is about to flow out through the port 45, immediately before it flows therethrough.

Figure 7:
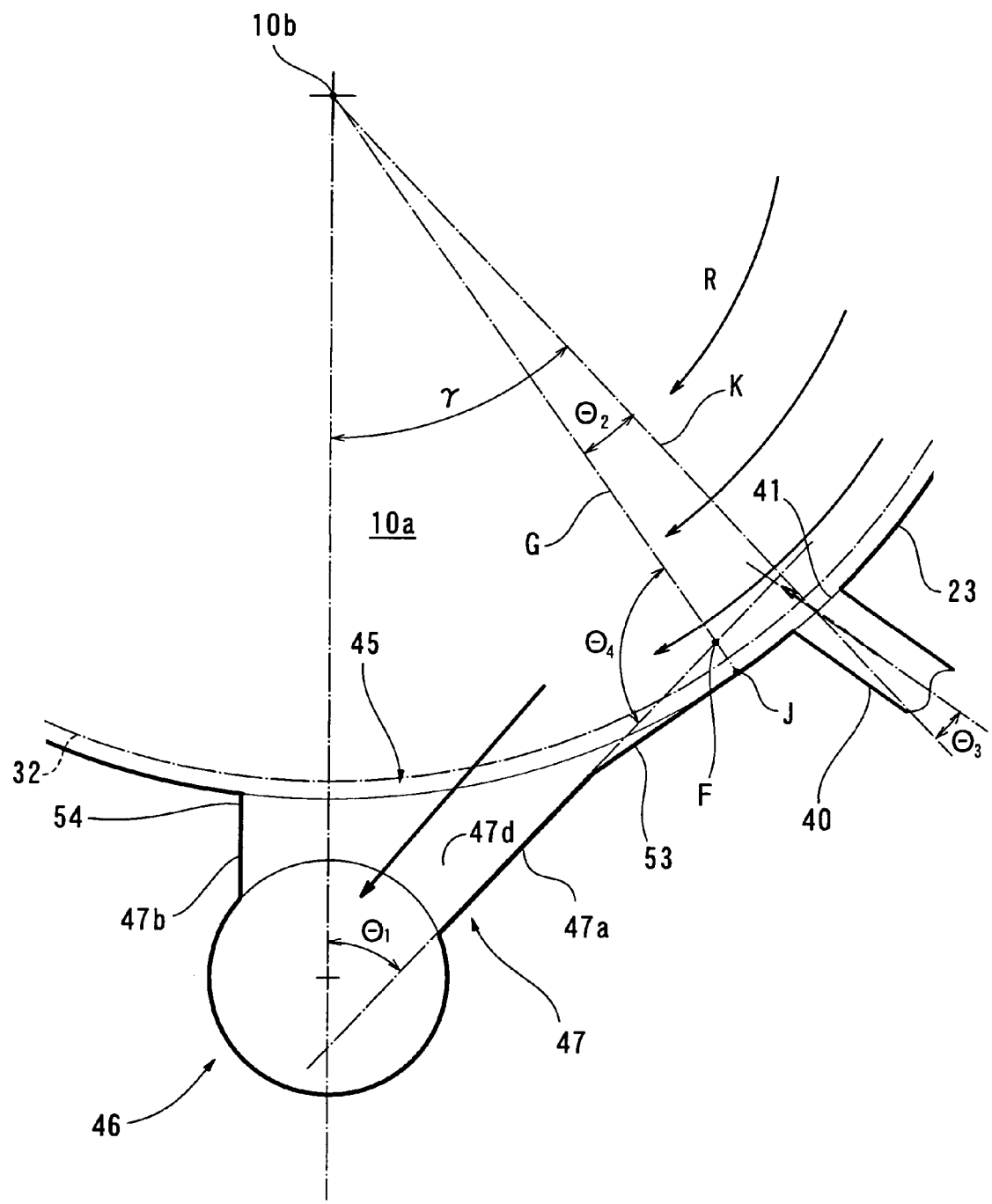
FIG. 7 is a schematic plan view which geometrically illustrates an arrangement of a mixing area, a hollow connector section and a slurry delivery conduit.

FIG. 7 is a schematic plan view which geometrically illustrates an arrangement of the annular wall 23, the slurry delivery conduit 46 and the hollow connector section 47. In FIG. 7, normal lines G, K extending from a center axis 10*b* of the disc 32 are shown by hypothetical lines.

The hollow connector section 47 is constructed from a vertical side wall 47*a* on the upstream side, a vertical side wall 47*b* on the downstream side, a horizontal top wall 47*c* (FIG. 3) and a horizontal bottom wall 47*d*. The vertical side wall 47*a* is inclined at a predetermined angle $\theta_4$ with respect to the normal line G of the mixer 10. The hollow connector section 47 diverges toward a mixing area 10*a* of the mixer 10 in accordance with the inclination of the wall 47*a*. The section 47 receives the slurry of the mixing area 10*a* generally in a tangential direction, and conducts the slurry to the slurry delivery conduit 46.

An edge portion of the port 45 on the upstream side in the rotational direction (a vertical side wall 53) continues to the wall 47*a*, and an edge portion of the port 45 on the downstream side in the rotational direction (a vertical side wall 54) continues to the wall 47*b*. The wall 53 is oriented approximately in a tangential direction of the annular wall 23, and the walls 54, 47*b* are oriented approximately in a diametrical direction. An extension line of the wall 47*a* and the normal line G intersect at an intersection F, and an angle $\theta_4$ (=180°−$\gamma$+$\theta_2$−$\theta_1$) at the intersection F is set to be in a range of 90°~180°. Preferably, the angle $\theta_4$ is set to be in a range of 90°~105°. The angle $\theta_4$ can be desirably set to be 90° (a right angle). In such a case, the wall 47*a* extends in a tangential direction from the annular wall 23.

An angle $\theta_2$ between a center of the foam feeding port 41 and an inner end J of the wall 53 is set to be in a range of 0°~90°. The angle $\theta_2$ is set to be preferably in a range of 0°~30°, and more preferably in a range of 0°~15°, so that the port 41 is in close proximity to the wall 53. The foam feeding conduit 40 is connected with the annular wall 23 at an angle $\theta_3$ with respect to the normal line K. The angle $\theta_3$ is set to be in a range of 0°~90°, and preferably in a range of 0°~60°, and more preferably in a range of 0°~30°. If desired, the conduit 40 can be connected with the wall 23 at the angle $\theta_3$ ranging from, e.g., −30° to 0° so that the port 41 is directed against the fluid in a rotational direction R, so far as the object of the present invention can be achieved.

As shown in FIGS. 4 to 6, a rotary disc 32 is rotatably located in the housing 20. A lower face of the enlarged lower portion 31 of the rotary shaft 30 is fixedly secured to a center part of the disc 32. The center axis 10*b* of the disc 32 coincides with an axis of rotation of the shaft 30. The disc 32 is rotated with rotation of the shaft 30 in a direction as indicated by the arrow R (clockwise direction).

The inside area 10*a* of the housing 20 can be divided into an inward zone and a peripheral zone by a hypothetical boundary 26. If desired, an annular partition wall 26' depending from a lower surface of the upper plate 21 as illustrated by hypothetical lines on FIGS. 5 and 6 can be provided in the housing 20 along the boundary 26. In such a case, the wall 26' is located in position substantially concentric with the annular wall 23, so that the inside area 10*a* is definitely divided into the peripheral zone close to a wear-resistant ring 23*a* and the inward zone located radially inward of the housing 20. The wear-resistant ring 23*a* is fixed to the inside surface of the annular wall 23.

A number of lower pins (movable pins) 38 are arranged on the rotary disc 32 in a plurality of rows extending generally in a radial direction. The lower pins 38 are vertically mounted on the upper surface of the disc 32 in the inward zone. The disc 32 is formed with a number of gear configurations 37 in the peripheral zone. The tooth configurations 37 act to displace or energize the mixed fluid (slurry) in an outward and rotational direction. A plurality of pins 36 are vertically fixed also on the tooth configurations 37.

As shown in FIGS. 5 and 6, a number of upper pins (stationary pins) 28 are fixed to the upper plate 21 to depend therefrom in the inside area 10*a*. The upper pins 28 and the lower pins 38 are alternately arranged in the radial direction of the disc 32 so that the pins 28, 38 make relative motion for mixing the materials of gypsum board when the disc rotates. Although the pins 28, 36, 38 with a round cross-section are illustrated in FIGS. 4 to 6, the pin 28, 36, 38 may have a polygonal or elliptical cross-section as disclosed in Japanese Patent Laid-Open Publication No. 2000-262882.

Figure 8:
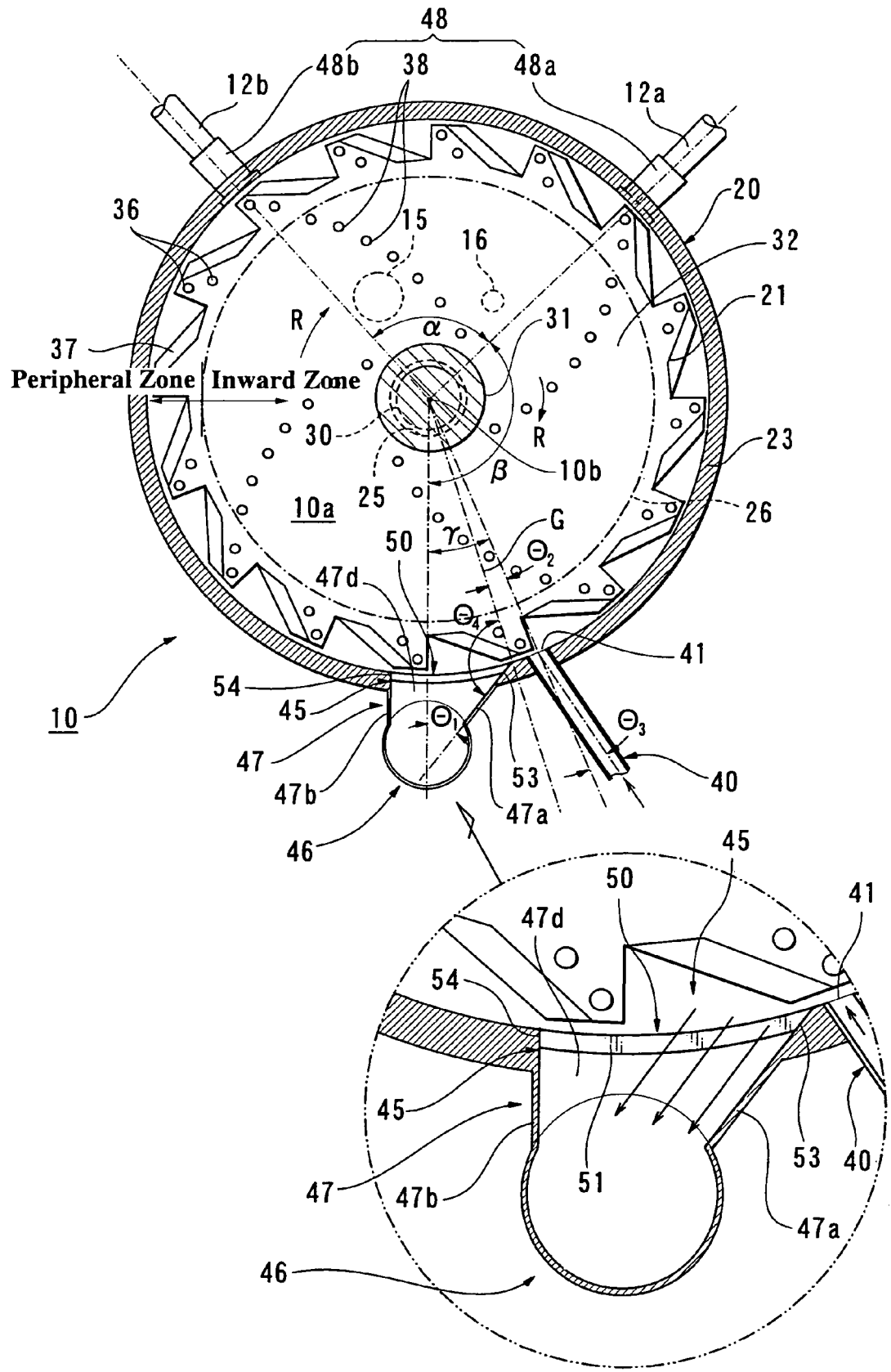
FIG. 8 is a vertical cross-sectional view and a partially enlarged transverse cross-sectional view of the mixer showing a second embodiment according to the present invention.
Figure 9:
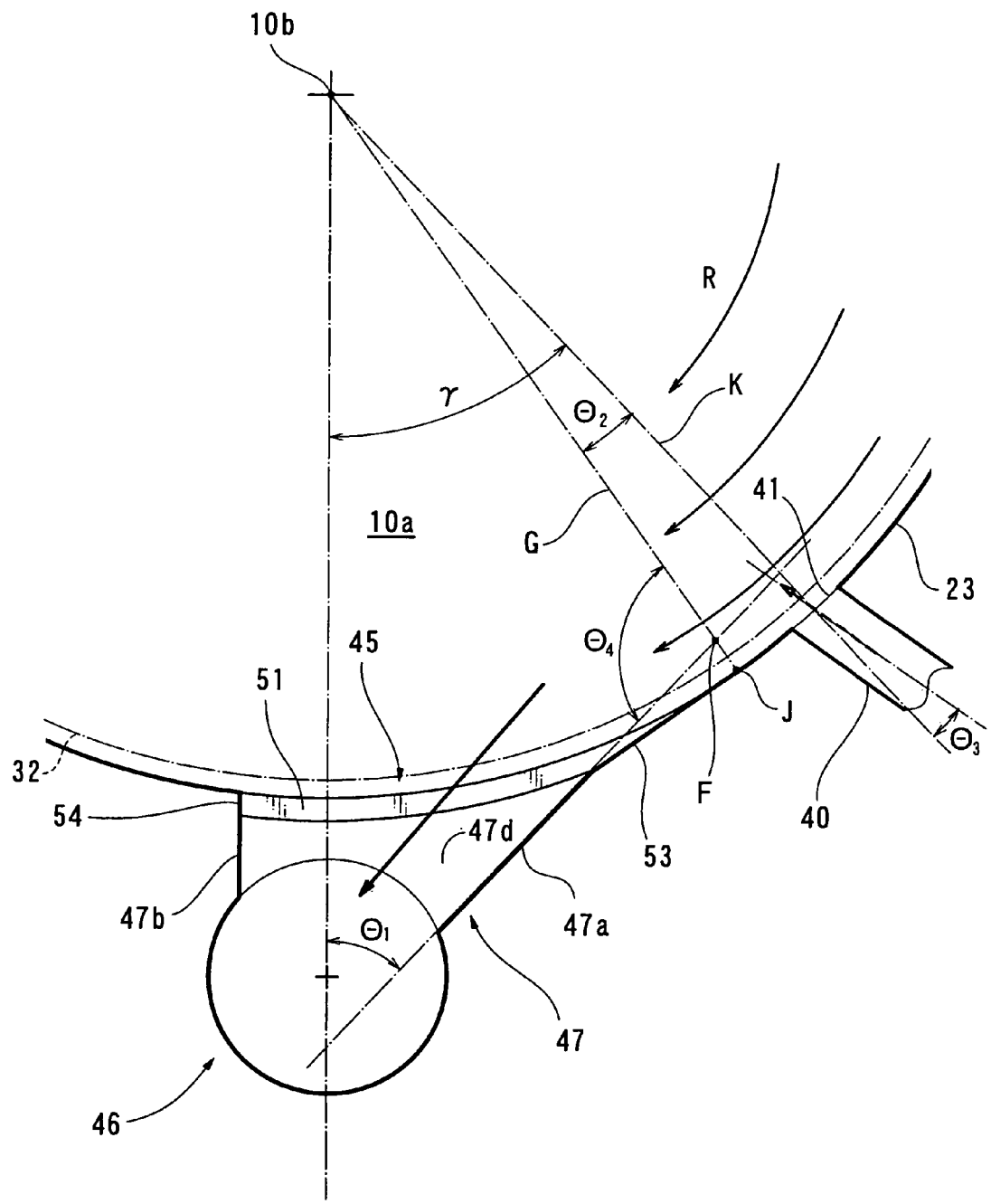
FIG. 9 is a schematic plan view which geometrically illustrates an arrangement of the mixing area, the hollow connector section and the slurry delivery conduit.
Figure 10:
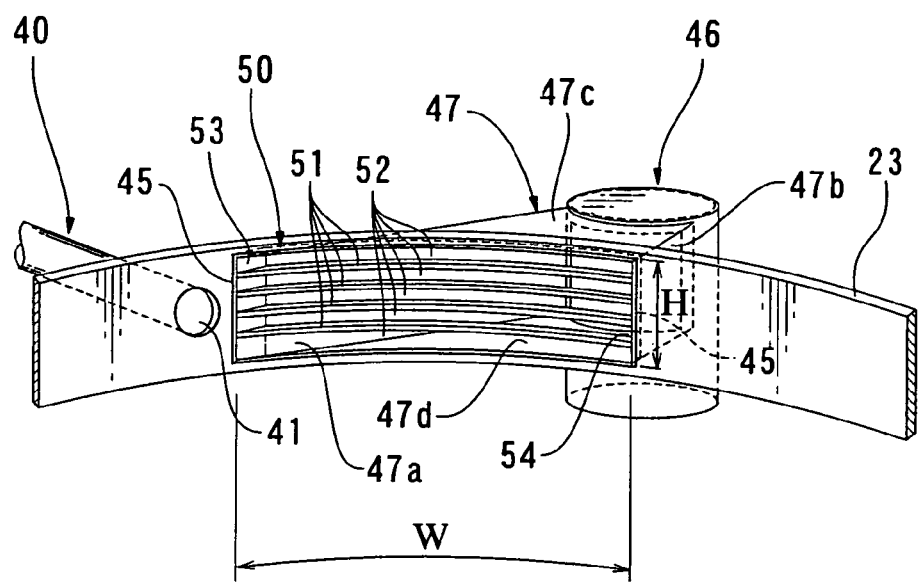
FIG. 10 is a perspective view and a partially enlarged vertical cross-sectional view showing a structure of an attachment.
Figure 10:
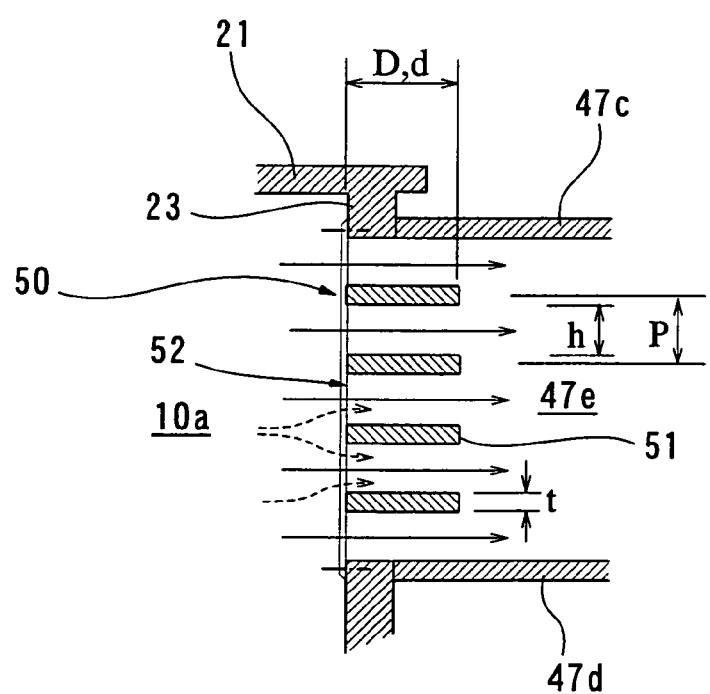

FIGS. 8 to 10 shows a second embodiment of the mixer according to the present invention. FIG. 8 is a transverse cross-sectional view and a partially enlarged cross-sectional view showing an internal structure of the mixer 10, and FIG. 9 is a schematic plan view which geometrically illustrates an arrangement of the annular wall 23, the slurry delivery conduit 46 and the hollow connector section 47. FIG. 10(A) is a partial perspective view showing a structure of the slurry outlet port 45 and FIG. 10(B) is an enlarged vertical cross-sectional view showing a structure of slit in the port 45.

As shown in FIGS. 8 and 10, an attachment 50 is detachably installed on an enlarged open end of the slurry outlet port 45. The attachment 50 is provided with a plurality of horizontal guide members 51. Conventional means for installation may be employed for installation of the attachment 50, such as fitting structure; adhesion; welding; or otherwise, fixing, cramping or securing by cramping tool or securing tool (cramp, bolt or the like).

The enlarged open end (width W, height H) of the hollow connector section 47 is jointed to the annular wall 23, and the reduced open end thereof is jointed to the slurry delivery conduit 46. The side walls 47*a*, 47*b*, top wall 47*c* and bottom wall 47*d* of the hollow connector section 47 constitute a slurry passage between the slurry outlet port 45 and the slurry delivery conduit 46, wherein a rectangular cross-section of the passage is reduced toward the conduit 46.

As shown in FIG. 10(A), the horizontal guide members 51 extend throughout the width of the port 45. The ends of each of the guide members 51 are fixed to right and left vertical frames of the attachment 50 (the vertical side walls 53, 54). The guide members 51 are arranged at regular intervals (interval P).

As shown in FIG. 10(B), the guide member 51 is a web plate made of metal or resin, which has a rectangular cross-section. The cross-sectional dimension of the guide member 51 is set to have thickness t=1~5 mm and depth D=5~50 mm (preferably, D=10~20 mm). The guide members 51 forms a plurality of horizontal blades circumferentially extending in the slurry outlet port 45. Horizontal slits 52 are defined between the guide members 51 as slurry passages, each having the height h (h=P−t), width w (w=W−width of the vertical frame of attachment) and depth d (d=D). The height h is set to be in a range of 4~15 mm.

The slurry outlet port 45 is divided into the slits 52 by the guide members 51. The mixing area 10*a* of the mixer 10 is in communication with a slurry passage 47*e* within the hollow connector section 47 by means of the slits 52.

Preferably, a plurality of grooves (not shown), into which the ends of the guide members 51 can be fit, are regularly arranged in the left and right vertical frames (vertical side walls 53, 54), vertically at predetermined intervals. Such an attachment 50 enables optimization of the dimension of the slit by changing the guide member 51 and the attachment 50 to those of an appropriate combination or assembly, when it is necessary to change the dimension of the slit and so forth in accordance with change of operating condition, composition of slurry, or the like. Further, such a structure of the attachment 50 enables renewal of only guide members 51 or replacement of guide members 51 with different guide members 51 of a proper configuration or material. Alternatively, a wide variety of attachments 50 with various dimensions or configurations of the slits may be previously reserved, whereby the whole attachment 50 can be replaced with the other attachment in accordance with change of operating condition, composition of slurry, or the like.

An operation of the mixer 10 is described hereinafter with respect to the first and the second embodiments.

The rotary disc 32 is rotated in the direction of arrow R by operation of the rotary drive means, and ingredients (powder materials) and mixing water to be mixed in the mixer 10 are fed to the mixer 10 through the powder supply conduit 15 and the water supply conduit 16. The ingredients and water are introduced into the inward zone of the mixer 10, agitated therein and mixed with each other, while moving radially outward on the disc 32 to the peripheral zone across the boundary 26 under the action of centrifugal force. The pins 36 on the tooth configuration 37 wipe or scrape off the slurry on the circumferential inside surface of the ring 23a.

The slurry produced in the mixing area 10a is displaced outward and frontward in the rotational direction by the tooth configuration 37, and the slurry flows out from the slurry outlet port 45 into the hollow connector section 47. The slurry flows through the section 47 into the slurry delivery conduit 46. The foam feeding port 41 of the foam feeding conduit 40 feeds a required quantity of foam to the slurry immediately before it flows out from the port 45, so that the foam mixes into the mixed ingredients in the peripheral zone.

In the mixer 10 of the first embodiment (FIGS. 2 to 7), the port 41 feeds the foam from the circumferential peripheral surface to the slurry immediately before the slurry flows out through the port 45. Even if the flow rate of slurry is increased, the foam is uniformly mixed in the slurry. The quantity of loss of the foam is reduced, since the foam is not substantially subjected to an agitation impact of the mixer.

In the mixer 10 of the second embodiment (FIGS. 8 to 10), which is provided with the guide members 51, the slurry flows into the slits 52 immediately after the foam is fed to the slurry. The slurry and the foam are subjected to a strong shearing force when flowing along the surface of the guide member 51, whereby they are mixed.

The slurry mixed with the foam flows through the hollow connector section 47 into the slurry delivery conduit 46 in which the slurry is subjected to a turning force and a shearing force so as to be mixed further uniformly, and thereafter, the slurry is discharged on the widthwise center area of the lower sheet 1 through the conduit 14 (FIG. 1), wherein the slurry delivery conduit 46 constitutes an external agitating area.

The slurry of the peripheral zone also flows into the conduits 12a, 12b through the fractionation ports 48 disposed upstream (direction opposite to the rotation) of the foam feeding port 41 and the hollow connector section 47. The slurry through the conduits 12a, 12b is discharged on the edge zones of the lower sheet 1 (FIG. 1). The slurry in the vicinity of the ports 48 is slurry which has not reached the foam feeding port 41, i.e., slurry to which the foam has not been added. Therefore, the slurry delivered to the edge zones through the ports 48 has a relatively high specific gravity.

The mixer 10 feeds the slurry with a relatively low specific gravity through the slurry delivery conduit 46 and the conduit 14 to the center area of the lower sheet 1, and the slurry with a relatively high specific gravity through the fractionation ports 48a, 48b and the conduits 12 to the respective edge zones of the lower sheet 1. According to such an arrangement of the mixer 10, both of the slurry with high specific gravity and the slurry with low specific gravity can be prepared by the single mixer, and therefore, the quantities of slurry differing in their specific gravity can be supplied to desired parts of the gypsum board production line, respectively. As such desired parts, equipment well-known by those skilled in the art can be exemplified, such as a roll coater for coating the gypsum board liner paper with the slurry of a high specific gravity so as to form a film thereon, or an auxiliary mixer for adding water or various additives to the slurry to be fed to the edge zones of the liner paper. The materials for gypsum board, which are conveyed to the dryer by the gypsum board production line (FIG. 1), include the slurry with a relatively low specific gravity in the center area and the slurry with a relatively high specific gravity in the edge zones. Such materials for gypsum board can be uniformly dried forcibly by the dryer downstream of the conveyance line.

The present inventors have made comparison of the following operating conditions:

(1) an operating condition in which the foam is merely mixed into the slurry in the center region of the mixer 10 so that the specific gravity of the solidified core of gypsum board is set to be 0.65~0.70 g/cm$^3$ ; and (2) an operating condition in which the foam is mixed into the slurry through the foam feeding port 41 of the conduit 40 in accordance with the present invention so that the specific gravity of the solidified core of gypsum board is also set to be 0.65~0.70 g/cm$^3$ .

The latter operating condition (the present invention), in which the foam is introduced from the port 41, has enabled the consumption of foaming agent to be reduced by approximately 35%.

FIG. 11(A) is a perspective view showing a modification of the structure of the attachment as shown in FIG. 10, and FIG. 11(B) is a partially enlarged transverse cross-sectional view showing the structure of slits in the slurry outlet port 45.

Figure 11:
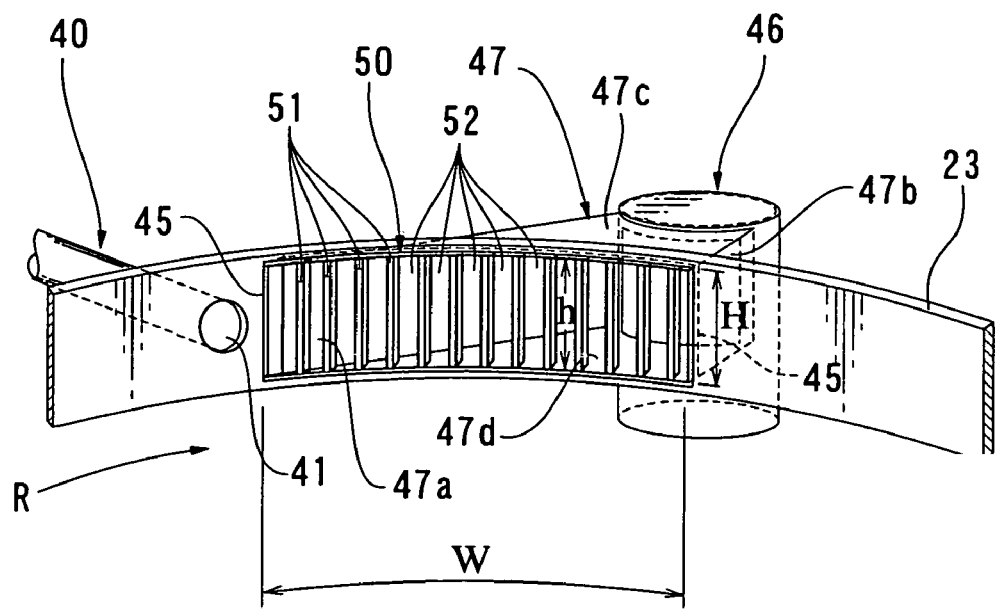
FIG. 11 is a perspective view and a partially enlarged transverse cross-sectional view showing an alternate structure of the attachment as shown in FIG. 10.
Figure 11:
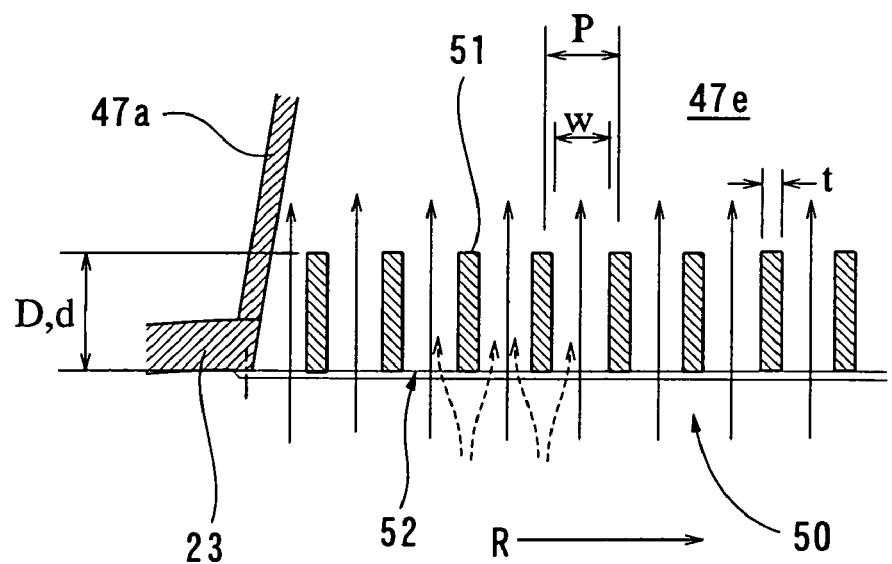

In the embodiment as shown in FIG. 11, the attachment 50 has a plurality of vertical guide members 51 disposed along the circumferential inside wall surface of the annular wall 23 at equal intervals (interval P). The upper end portion of the guide member 51 is fixed to an upper frame of the attachment 50, and the lower end portion thereof is fixed to a lower frame of the attachment 50. The guide members 51 forms a number of vertical blades, and the vertical slits 52 with the dimension of fluid passage w are defined between the blades in the slurry outlet port 45. Each of the slits 52 makes a slurry passage with a cross-section and a length (width w, height h, depth d) corresponding to the interval P and the depth D of the guide member 51. Thus, the slurry outlet port 45 is divided into the slits 52 so that the mixing area 10a of the mixer 10 is in communication with the slurry passage 47e of the section 47 through the slits 52.

Figure 12:
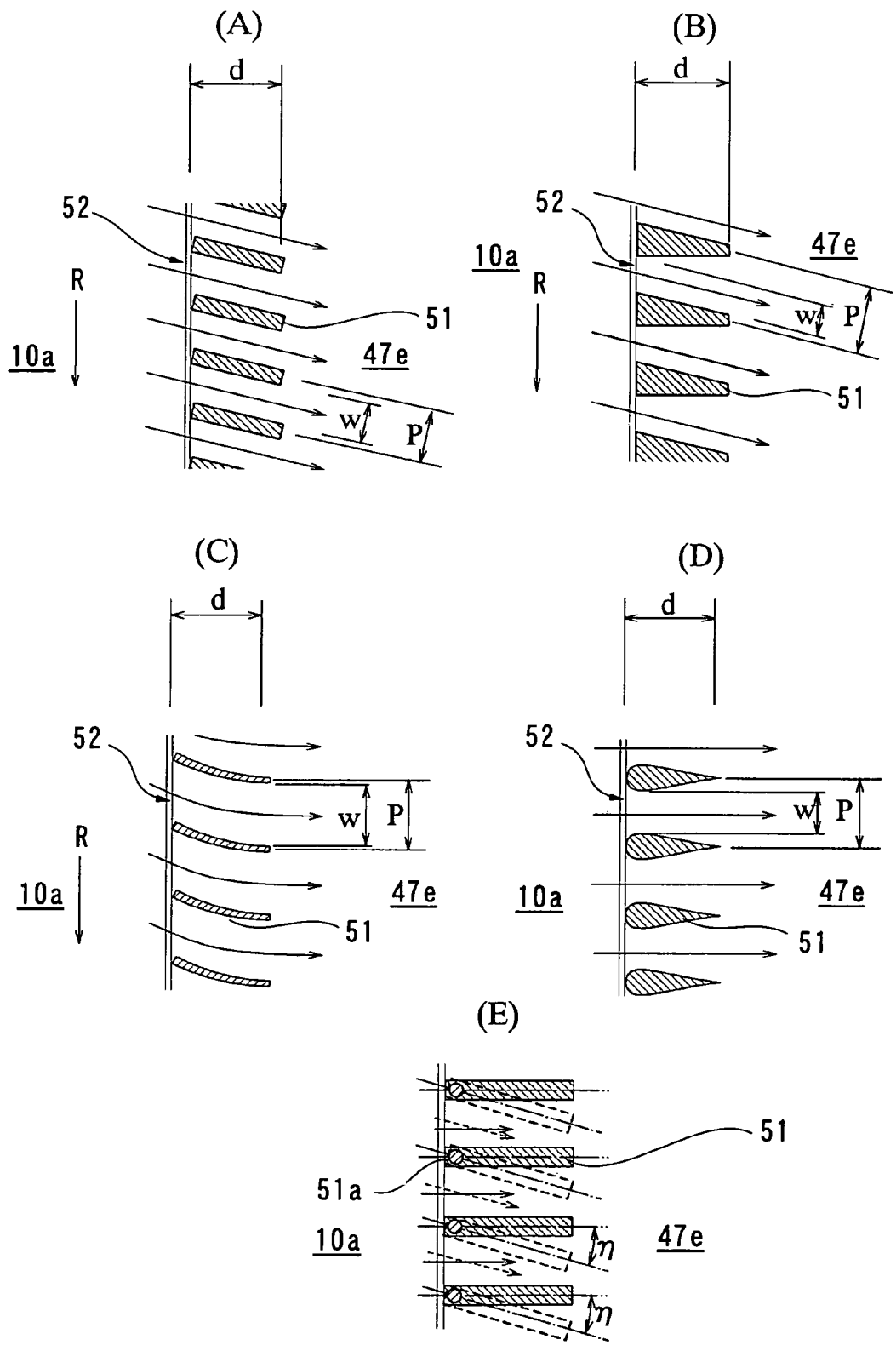
FIG. 12 is a partially enlarged cross-sectional view of the attachment showing modifications of guide members.

FIG. 12 is a partially enlarged cross-sectional view of the attachment showing modifications of the guide member 51.

As illustrated in FIG. 12, the guide members 51 may be inclined in a rotational direction R for smooth effluence of the slurry (FIG. 12(A)). The cross-section of the member 51 is not limited to a rectangular configuration, but it may be, e.g., a cross-section reducing toward the direction of slurry flow (FIGS. 12(B) and 12(D)), or a curved cross-section corresponding to the slurry flow configuration (FIG. 12(C)). Further, the guide member 51 may be mounted on the frame of the attachment 50 pivotably about a rotary shaft 51a, as shown in FIG. 12(E). In such a case, an inclined angle η of the respective guide members 51 relative to the rotational direction R or a horizontal plane can be variably set by an angle regulating mechanism (not shown). Action of the blade on the slurry can be adjusted by adjustment of the angle η, so that the shearing force acting on the slurry can be adjusted.

Figure 13:
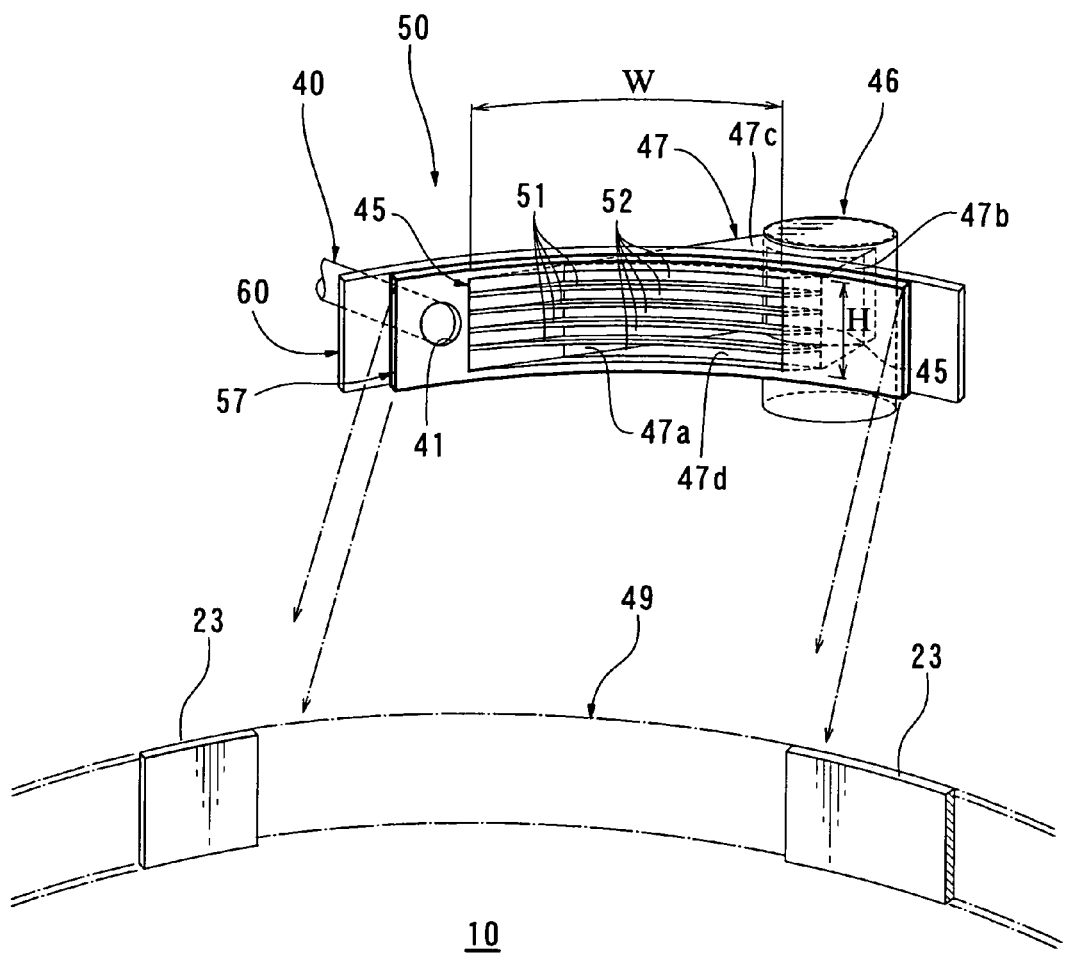
FIG. 13 is a perspective view showing the attachment which has the foam feeding conduit, the hollow connector section and the slurry delivery conduit integrally assembled.
Figure 14:
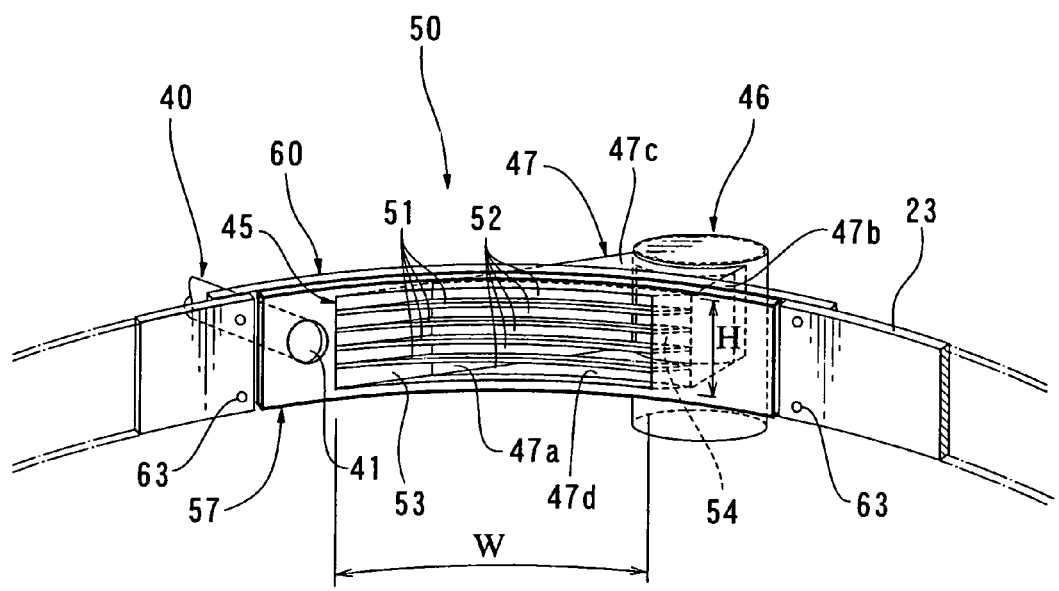
FIG. 14 is a perspective view showing a condition of installation of the attachment as shown in FIG. 13.
Figure 15:
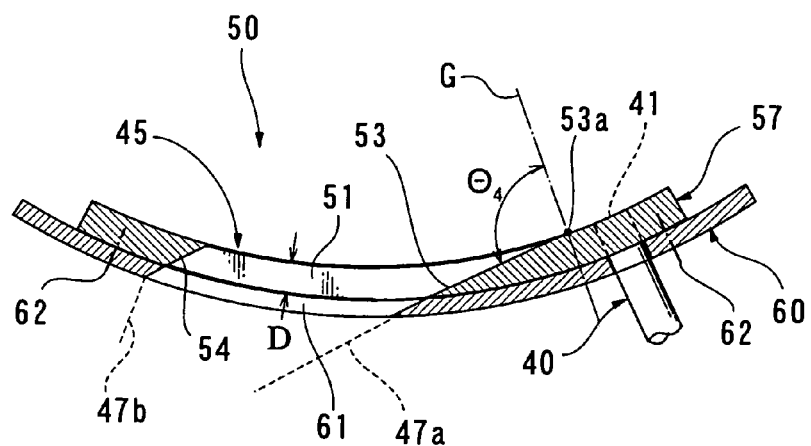
FIG. 15 is a transverse cross-sectional view showing the attachment.

FIG. 13 is a perspective view showing the attachment 50 which has a foam feeding conduit 40, the foam feeding port 41, the hollow connector section 47 and the slurry delivery conduit 46 integrally assembled. FIG. 14 is a perspective view showing a condition of installation of the attachment 50 shown in FIG. 13 on the annular wall 23 of the mixer 10. FIG. 15 is a transverse cross-sectional view showing a structure of a body part 57 and a bracket 60 of the attachment shown in FIGS. 13 and 14, and FIG. 16 includes a front elevation, a transverse cross-section and a rear elevation showing the structure of the body part 57.

Figure 16:
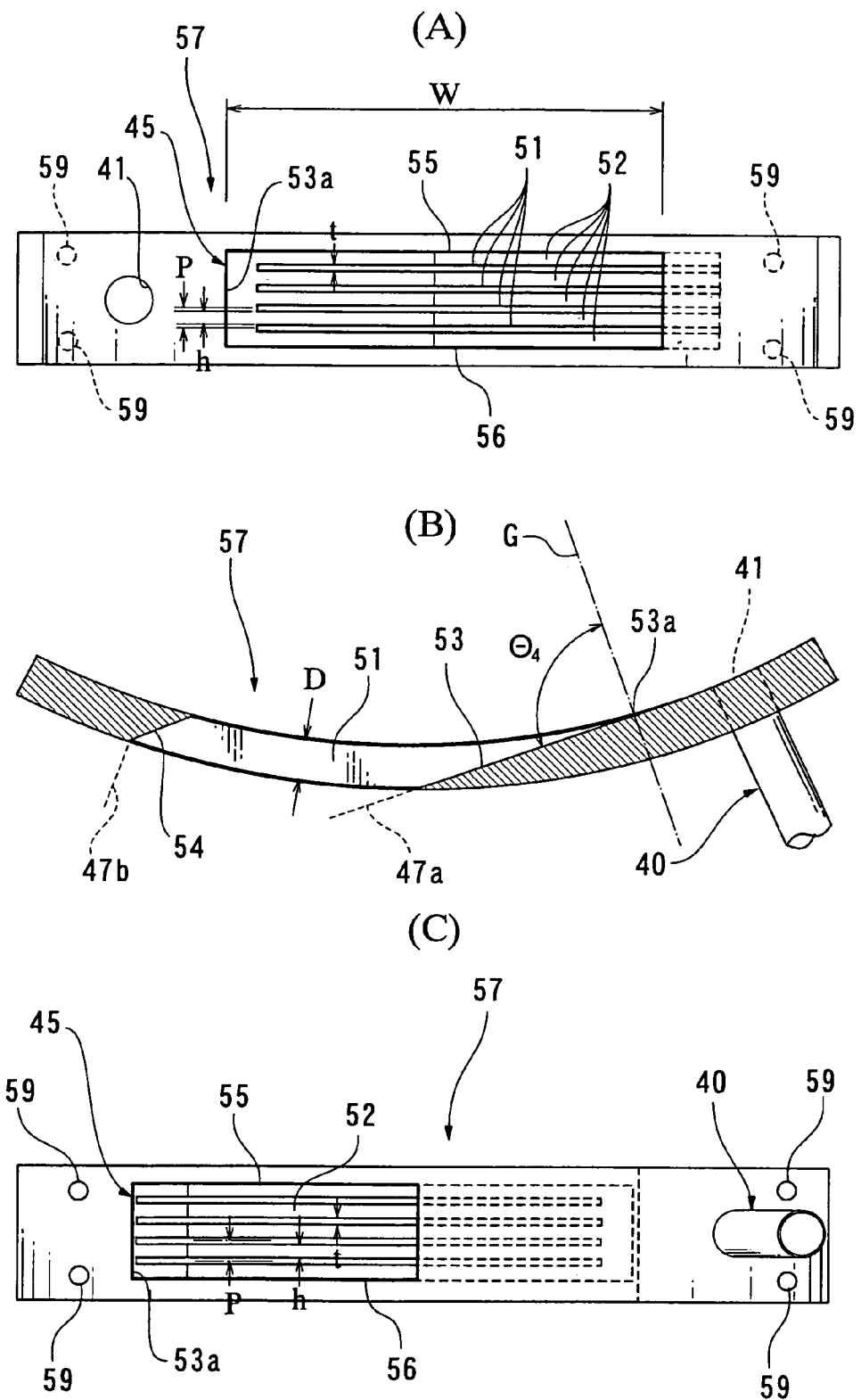
FIG. 16 shows a front elevational view, a transverse cross-sectional view and a rear elevational view in which a structure of a body part of the attachment is illustrated.

The attachment 50 as shown in FIGS. 13 to 16 has the body part 57 with the foam feeding port 41, slurry outlet port 45 and slits 52, and an arcuate bracket 60 for fixing the body part 57 on the annular wall 23. As shown in FIG. 13, the body part 57 and the bracket 60 are integrally jointed together. An opening 61 conforming to the slurry outlet port 45 is formed in the bracket 60. The body part 57 is a relatively thick arcuate plate, which has a vertical side wall 53 extending at an angle $\theta_4$ relative to the normal line G (FIGS. 15 and 16), and a vertical side wall 54 inclined in a direction similar to that of the wall 53. These walls 53, 54, a horizontal top wall 55 and a horizontal bottom wall 56 (FIG. 16) form the slurry outlet port 45 in a center of the body portion 57. The horizontal guide members (horizontal blades) 51 are supported by the walls 53, 54 and the horizontal slits 52 are formed in the port 45. As shown in FIG. 16, bolt holes 59 are bored at end portions of the body part 57, and the part 57 is fixed to the bracket 60 by bolts 62 screwed in the holes 59 through the bracket 60, as shown in FIG. 15.

As shown in FIG. 13, the enlarged end of the section 47 is integrally connected to the bracket 60 and the reduced end thereof is integrally connected to the upper end portion of the conduit 46. The integrally assembled part 57, bracket 60, section 47 and conduit 46 provide the integral attachment 50, which can be fit in the opening 49 of the wall 23.

The body part 57 is formed with the foam feeding port 41. The end portion of the foam feeding conduit 40 extends through the bracket 60 to be jointed to the port 41. The port 41 is positioned in the vicinity of the edge 53a of the wall 53 (FIG. 15).

As shown in FIGS. 13 and 14, the attachment 50 is installed on the opening 49 and fixed to the wall 23 by bolts 63. Thus, the mixer 10 is provided with a series of slurry supply passages including the section 47 and the conduit 46.

According to such an arrangement of the attachment 50, the mixer 10 can be provided with a series of fluid passages for feeding slurry, merely by fixing the attachment 50 to the wall 23 with the bolts 63. The series of fluid passage can be wholly removed from the mixer 10 by disengaging the bolts 63 and detaching the attachment 50 from the wall 23. Therefore, maintenance of the attachment 50, such as cleaning, repair or replacement of parts, can be readily performed, or the attachment 50 can be relatively easily replaced with other attachments of dimensions, structures or materials of other designs or specifications.

Figure 17:
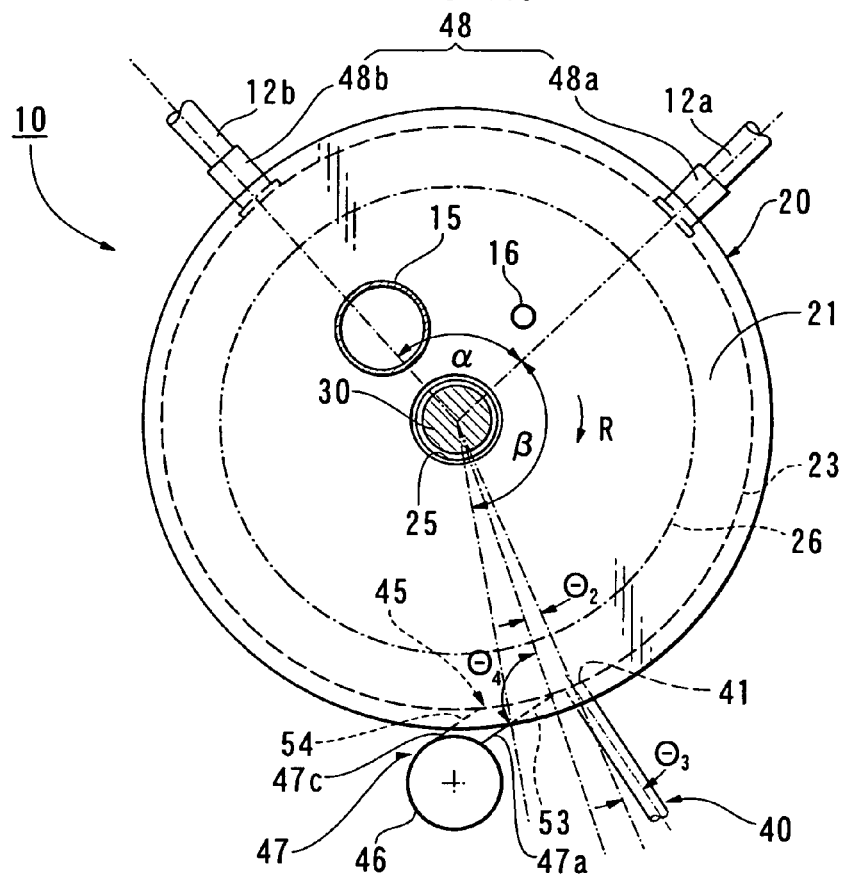
FIGS. 17 and 18 are a plan view and a perspective view of the mixer showing a third embodiment according to the present invention.
Figure 18:
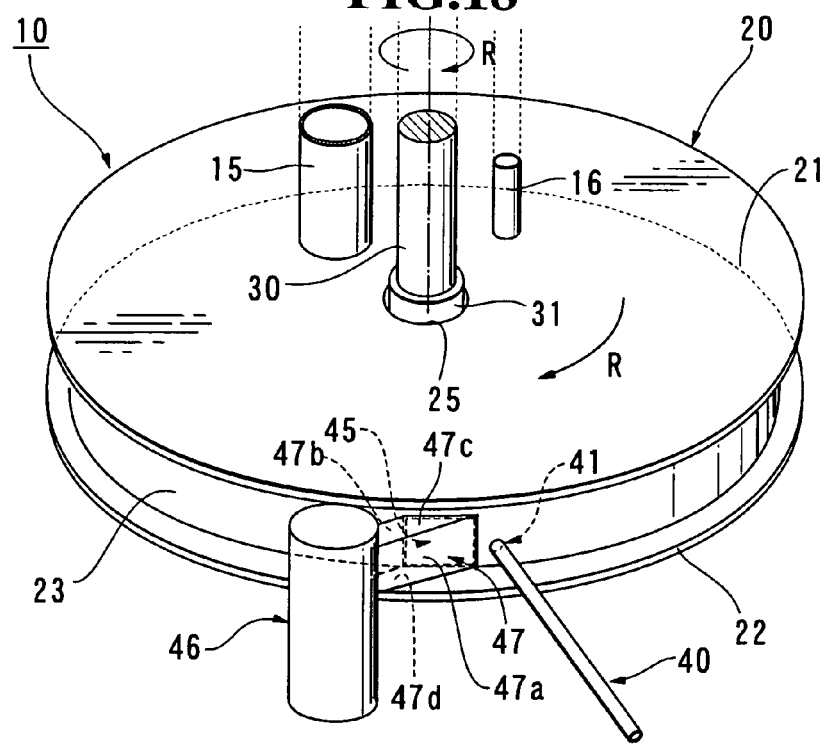
Figure 19:
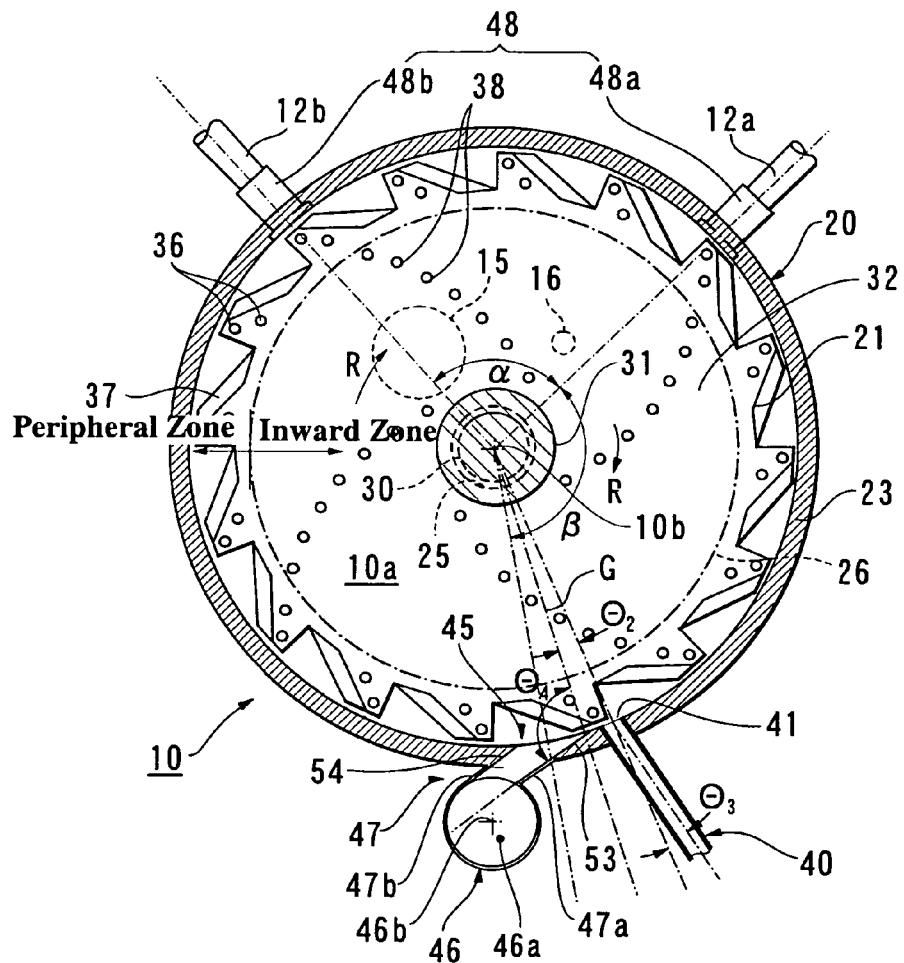
FIGS. 19 and 20 are a transverse cross-sectional view and a fragmentary sectional perspective view which show an internal structure of the mixer as shown in FIGS. 17 and 18.
Figure 20:
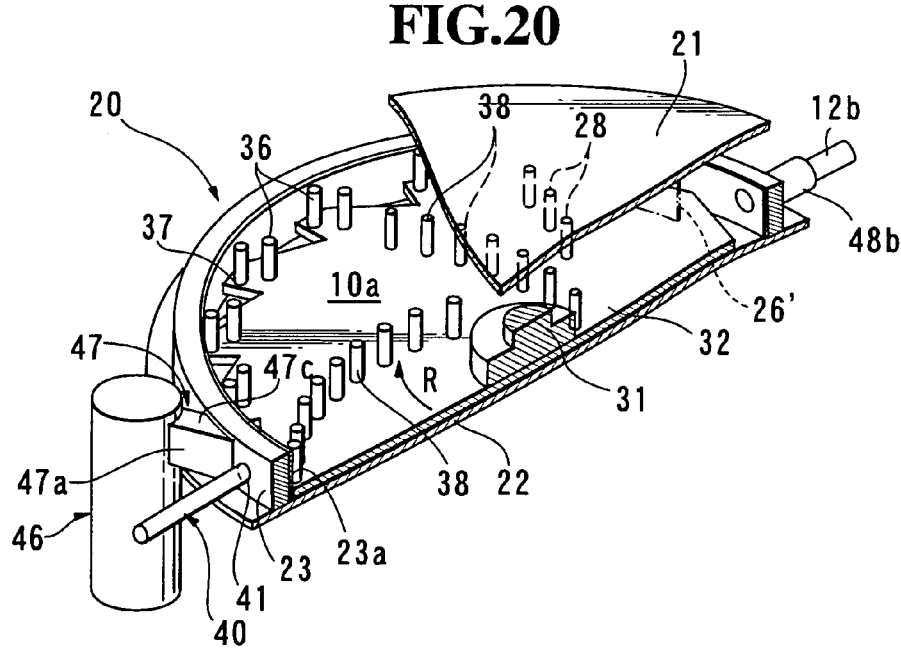
Figure 21:
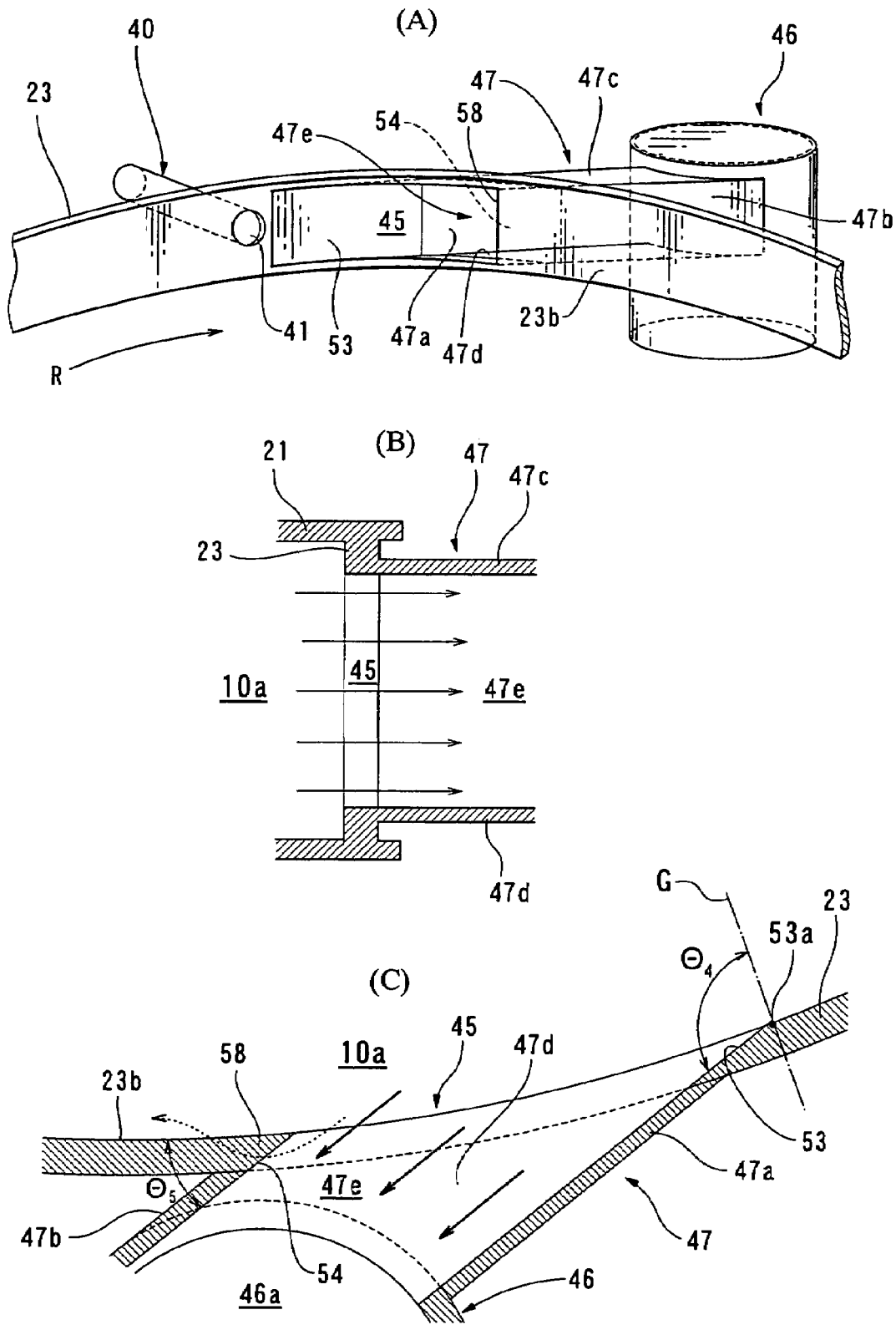
FIG. 21 includes a perspective view and a partially enlarged vertical cross-sectional view showing the attachment which has the foam feeding conduit, the hollow connector section and the slurry delivery conduit integrally assembled.

A third embodiment of mixer according to the present invention is shown in FIGS. 17 to 26. FIGS. 17 and 18 are a plan view and a perspective view showing the structure of the mixer of the third embodiment, and FIGS. 19, 20 and 21 are transverse and vertical cross-sectional views, a fragmentary sectional perspective view and a partially enlarged cross-sectional view, which show an internal structure of the mixer as shown in FIGS. 17 and 18. In FIGS. 17 to 21, substantially the same constituents as those shown in FIGS. 1 to 16 are indicated by the same reference numerals.

In the aforementioned embodiments, the hollow connector section 47 has the structure enlarging toward the annular wall 23, but the section 47 in this embodiment has a generally equal cross-section and extends approximately in a tangential direction of the wall 23. Further, the slurry outlet port 45 in the aforementioned embodiments is provided with the guide members 51 and the slits 52. However, the port 45 in this embodiment does not have the guide members 51 and the slits 52, but it opens fully.

An end of the section 47 is connected with the wall 23 and another end thereof is connected with conduit 46. The vertical side wall 47a, 47b, the horizontal top wall 47c and the horizontal bottom wall 47d of the section 47 defines a slurry passage 47e with an equal rectangular cross-section between the port 45 and the conduit 46.

As shown in FIG. 21, an edge of the port 45 on its upstream side constitutes the vertical side wall 53 continuing to the wall 47a, and an edge of the port 45 on the downstream side constitutes the vertical side wall 54 continuing to the wall 47b. The wall 54 defines a relatively sharp vertical frame 58. The frame 58 with a sharp angle $\theta_5$ is directed toward the upstream side in the rotational direction. The frame 58 conducts the slurry of the mixing area 10a into the port 45 and prevents the slurry in the port 45 from flowing backward or returning to the area 10a as indicated by a dotted line (FIG. 21(C)). Such a configuration of the vertical frame 58 is important for extracting the slurry from the mixer in an approximately tangential direction of the circumferential inside wall surface of the wall 23.

The vertical side walls 47a, 47b, 53, 54 extend at a predetermined angle $\theta_4$ relative to the normal line G. The angle $\theta_4$ is set to be 90°~180°, and preferably, 90°~105°. More preferably, the angle $\theta_4$ is set to be 90° (a right angle), so that the wall 47a extends in a tangential direction of the wall 23. The port 45 and the section 47 open to the mixing area 10a of the mixer 10 so as to receive the slurry in an approximately tangential direction of the circumferential inside wall of the wall 23, and they conduct the slurry effluent to the conduit 46.

Figure 22:
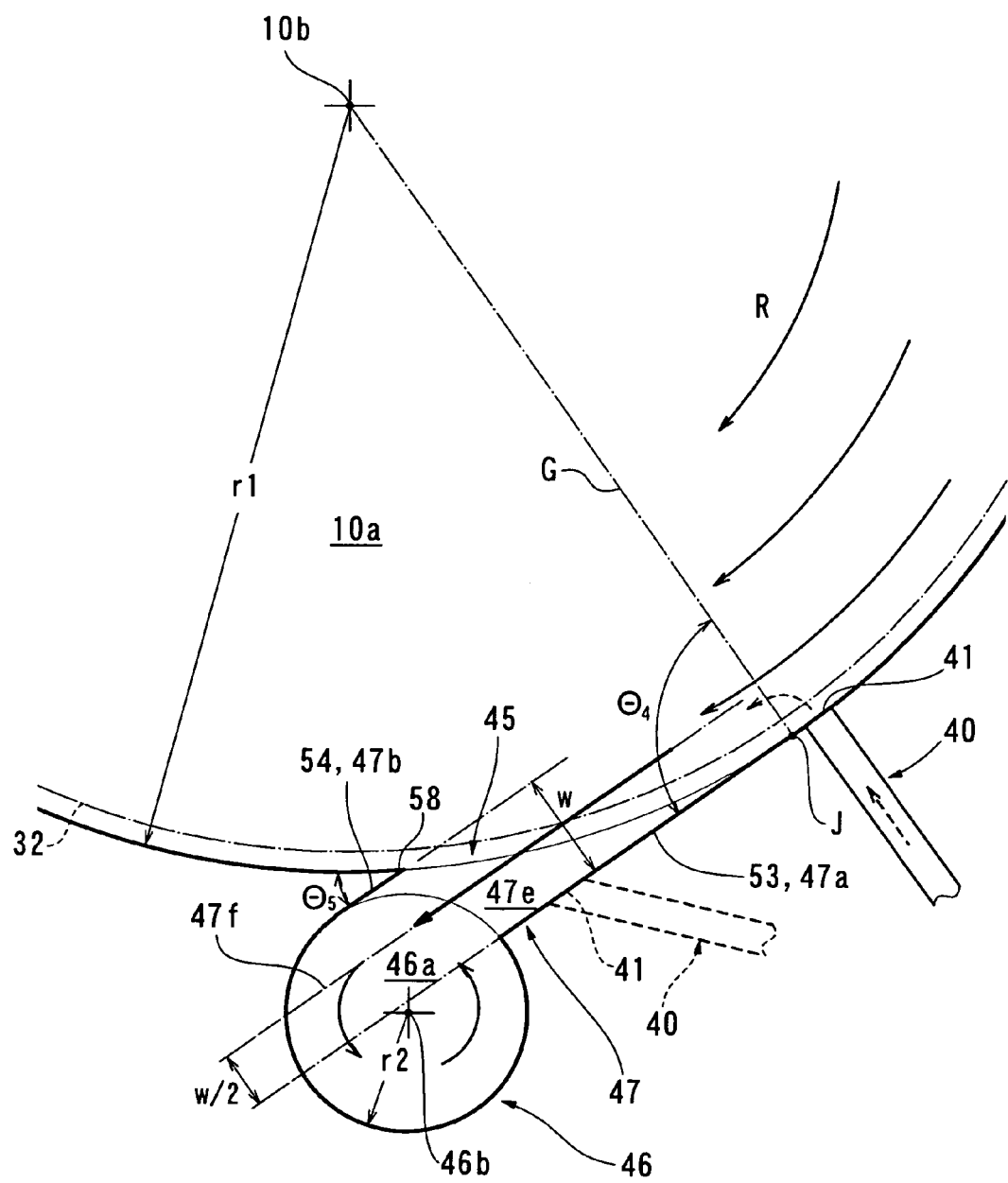
FIG. 22 is a schematic plan view which geometrically illustrates an arrangement of the mixing area, the hollow connector section and the slurry delivery conduit.

FIG. 22 is a schematic plan view which illustrates a geometrical positional relation among the area 10a, the section 47 and the conduit 46.

The mixing area 10a of the mixer 10 has a round transverse cross-section with a radius r1, a center of which resides on an axis 10b of the disc 32. The inside area 46a of the conduit 46 has a round transverse cross-section with a radius r2, a center of which resides on an axis 46b. The section 47 is connected to the conduit 46 eccentrically on one side (on the side of the wall 23 in this embodiment). Therefore, the slurry passage 47e opens to the area 46a in a position eccentric on one side.

The slurry effluent from the area 10a to the slurry passage 47e flows through the passage 47e along a center 47f thereof, and it enters the area 46a having a round transverse cross-section, generally in a tangential direction. Swirling or turning force acts on the slurry entering the area 46a with the eccentricity of the area 46a and the passage 47e, so that the slurry flows in rotation along a circumferential inside wall surface of the area 46a. The swirling direction of the slurry is opposite to the rotational direction R of the disc 32, i.e., counter-clockwise direction, so that the slurry undergoes a mixing and stirring action with such a swirling motion.

In FIG. 22, the passage 47e is generally connected to a half of the conduit 46 on one side, but the passage 47e may be connected to the conduit 46 in such a manner that a part of the passage 47e opens to the other half of the conduit 46.

The foam feeding port 41 opens on the circumferential inside wall surface of the wall 23 in close proximity to the port 45 so as to feed the foam to the slurry immediately before the slurry flows into the passage 47e. Alternatively, the port 41 may open on the wall 47a so as to feed the foam to the slurry in the passage 47e, as shown by dotted lines in FIG. 22.

An operation of the mixer 10 as shown in FIGS. 17~22 is described hereinafter.

The rotary disc 32 is rotated in the direction of arrow R with operation of the rotary drive means, and ingredients (powder materials) and mixing water to be mixed in the mixer 10 are fed into the mixer 10 through the powder supply conduit 15 and the water supply conduit 16. The ingredients and water are introduced into the inward area of the mixer 10, and agitated and mixed with each other, while moving radially outward on the disc 32 to the peripheral zone across the boundary 26 under the action of centrifugal force. The pins 36 on the tooth configurations 37 wipe or scrape off the slurry on the inside circumferential surface of the ring 23a.

The slurry produced in the mixing area 10a is displaced outward and forward in the rotational direction by the tooth configurations 37. The slurry flows out from the slurry outlet port 45 substantially in the tangential direction and flows through the section 47 into the conduit 46. The foam feeding conduit 40 feeds a required quantity of foam to the slurry immediately before it flows through the port 45, so that the foam mixes in the slurry in the peripheral zone. The slurry flows in the tangential direction through the port 45 into the section 47 immediately after the slurry is fed with the foam. The slurry and the foam are straightened in the passage 47e which has a substantially equal cross-section, so that they enter the area 46a of the conduit 46 through the passage 47e as a streamline slurry flow. In a case where the foam feeding port 41 is positioned on the wall 47a, the foam mixes in the slurry entering the port 45, and immediately thereafter, it enters the conduit 46 from the passage 47e.

The slurry and the foam, which entered the area 46a, turn around the center axis 46b of the conduit 46, and swirl along the circumferential inside wall surface of the area 46a. Owing to the swirling motion or turning motion of the slurry in the area 46a, the slurry and the foam are subjected to shearing force and are mixed with each other, so that the foam is uniformly dispersed in the slurry. The slurry in the conduit 46 gravitationally flows down therein so as to be discharged to the widthwise center area of the lower sheet 1 through the conduit 14 (FIG. 1).

Further, the slurry of the peripheral zone is introduced into the conduits 12a, 12b through the fractionation ports 48a, 48b disposed upstream (direction opposite to rotation) of the ports 41, 45, and the slurry is discharged through the conduits 12a, 12b to the edge zones of the lower sheet 1 (FIG. 1). The slurry in the vicinity of the ports 48 is the slurry which has not yet reached the port 41, i.e., the slurry which has not been fed with the foam. Therefore, the slurry delivered to the edge zones through the ports 48 has a relatively high specific gravity.

Thus, the mixer 10 feeds the slurry with a relatively low specific gravity through the slurry delivery conduit 46 and the conduit 14 to the center area of the lower sheet 1, and the slurry with a relatively high specific gravity through the ports 48 and the conduits 12 to the respective edge zones of the lower sheet 1. According to such an arrangement of the mixer 10, both of the slurry with high specific gravity and the slurry with low specific gravity can be prepared by the single mixer, so that quantities of slurry with different specific gravities can be supplied to desired portions of the gypsum board production line. The green boards, which are conveyed to the dryer by the gypsum board production line (FIG. 1), have the slurry with a relatively low specific gravity in their center areas and the slurry with a relatively high specific gravity in their edge zones, so that they are uniformly dried by the dryer on the downstream side of the conveyor line.

Similarly to the aforementioned embodiments, it has been found that the consumption of foaming agent can be eliminated by approximately 35%, when gypsum boards having a core with the specific gravity of 0.65~0.70 are produced by the mixer 10 with this arrangement.

Figure 23:
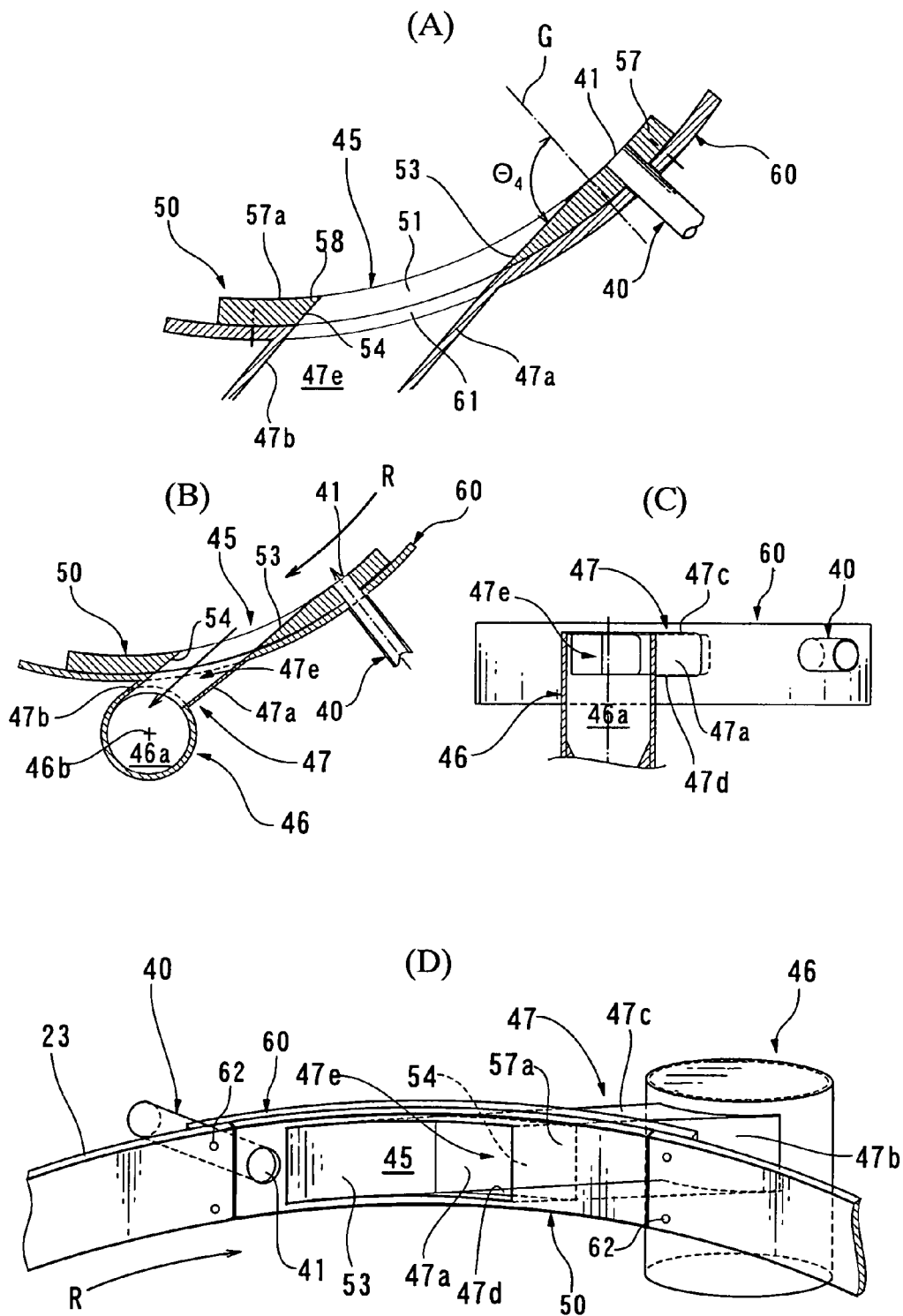
FIG. 23 shows a transverse cross-sectional view, a side elevational view and a perspective view in which a structure of the attachment is illustrated.

FIG. 23 includes a transverse cross-sectional view, a side elevational view and a perspective view showing a structure of the attachment 50 provided with the port 45, the section 47 and the conduit 40 integrally assembled.

The attachment 50 as shown in FIG. 23 has an arrangement in that an arcuate body part 57 is formed with the slurry outlet port 45, and that the hollow connector section 47 and the foam feeding conduit 40 are integrally assembled on the body part 57. An arcuate bracket 60 for fixing the body part 57 on the annular wall 23 is secured on an outside surface of the body part 57. The bracket 60 is formed with an opening 61 conforming to the port 45. An upstream end of the section 47 is integrally jointed to the bracket 60, and a downstream end thereof is integrally jointed to an upper end portion of the conduit 46. The annular wall 23 is formed with an opening corresponding to the body part 57. As shown in FIG. 23(D), the bracket 60 is fixed to the wall 23 by fixing elements 62 such as bolts, and the circumferential inside wall surface 57a of the body part 57 constitutes a part of the wall 23.

According to such an arrangement of the attachment 50, maintenance of the attachment 50, such as cleaning, repair or replacement of parts, can be readily performed by detaching the attachment 50 from the wall 23. If desired, the attachment 50 can be relatively easily replaced with other attachments having dimensions, structures or materials of other designs or specifications.

Figure 24:
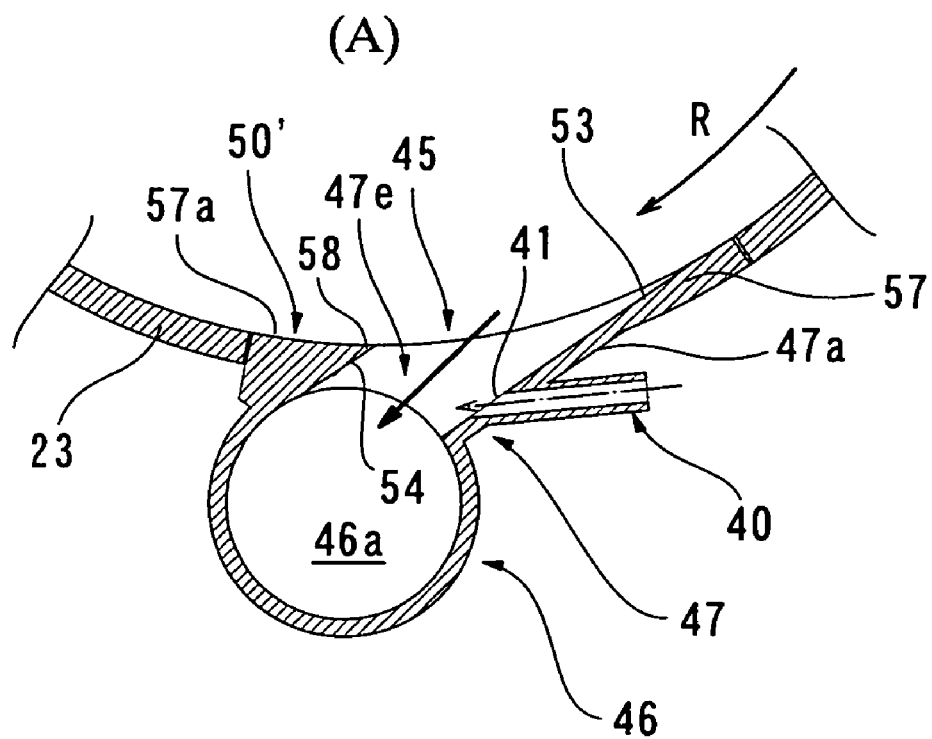
FIG. 24 shows a transverse cross-sectional view and a side elevational view of an alternate structure of the attachment.
Figure 24:
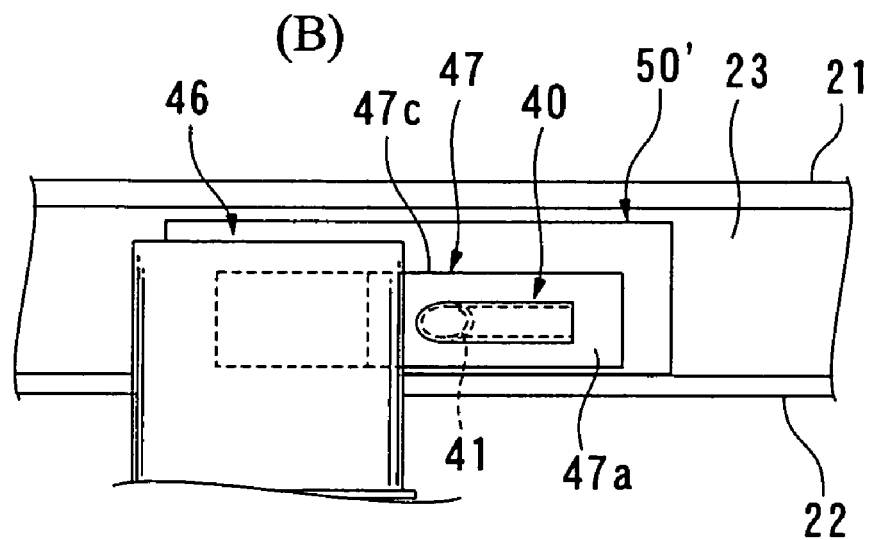

FIG. 24 includes a transverse cross-sectional view and a side elevational view showing a modification of the attachment 50.

The attachment 50' as shown in FIG. 24 has an arrangement in that the slurry outlet port 45, the slurry delivery conduit 46, the hollow connector section 47 and that foam feeding conduit 40 are integrally assembled, similarly to the attachment as shown in FIG. 23. However, the conduit 40 is connected to the section 47. The foam feeding port 41 opens on the wall 47a on the upstream side of the section 47, and the foam is introduced into the slurry in the passage 47e from the wall 47a by the port 41. According to such a location of the port 41, mixing and stirring of the slurry and the foam substantially depend on the swirling motion or turning motion of the slurry in the area 46a.

Figure 25:
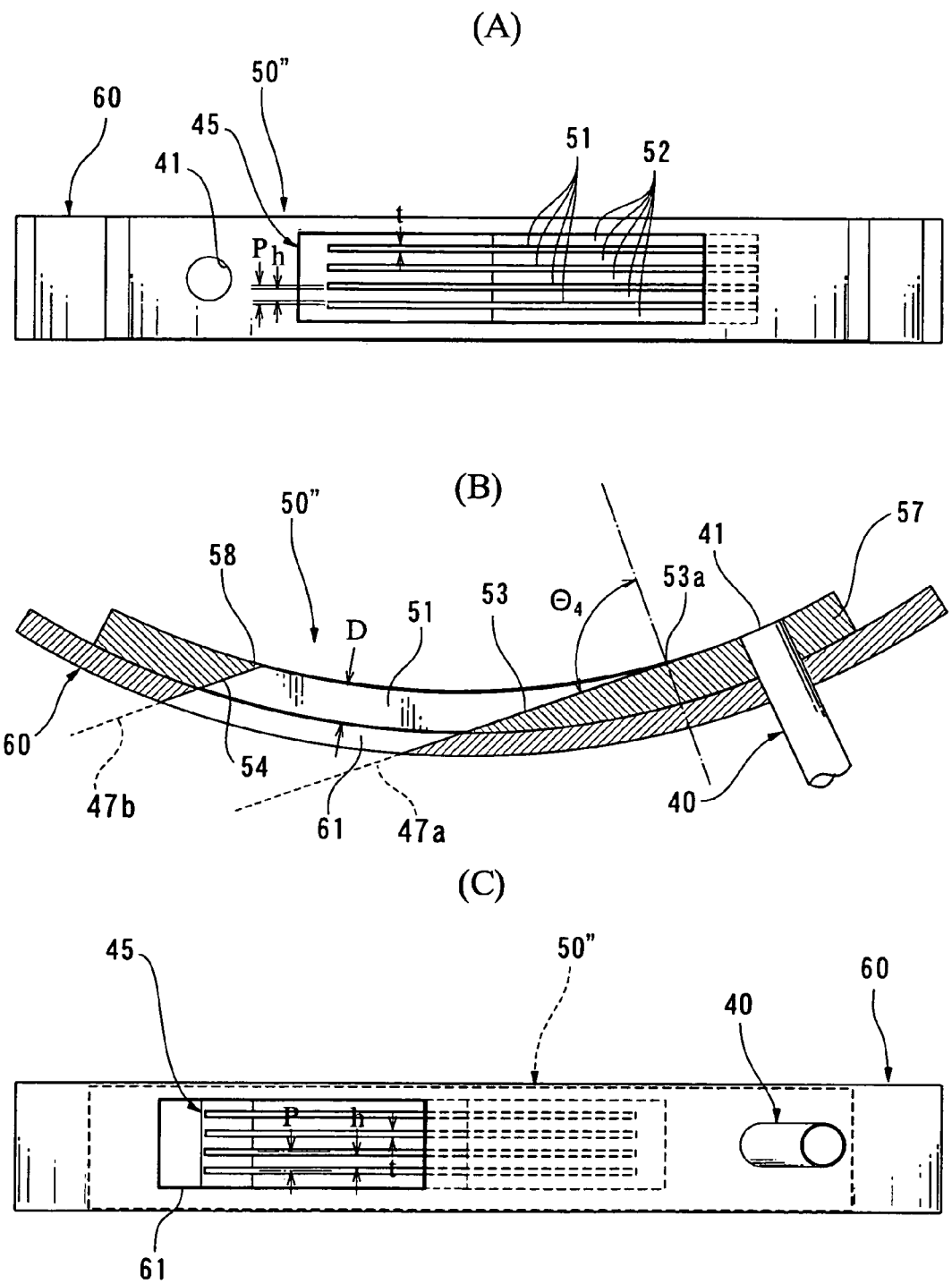
FIG. 25 shows a front elevational view, a transverse cross-sectional view and a rear elevational view of another alternate structure of the attachment.

FIG. 25 includes a front elevational view, a transverse cross-sectional view and a rear elevational view showing an attachment 50" which is another modification of the attachment 50.

The attachment 50" as shown in FIG. 25 has a plurality of horizontal guide members 51 extending in a circumferential direction along the circumferential inside wall surface of the wall 23. Both ends of the guide member 51 are secured to the right and left vertical side walls 53, 54 of the attachment 50".

As illustrated by dotted lines, the vertical side walls 47a, 47b are jointed to the walls 53, 54 at an angel ($\theta_4$) identical with the angle of the walls 53, 54. The slurry and the foam entering the slits 52 are subjected to a strong shearing force upon flowing along the surface of the guide member 51 so as to be mixed with each other. The slurry and the foam swirl along the circumferential inside wall surface of the conduit 46, whereby they are further uniformly mixed by shearing force acting on the slurry and the foam during swirling or turning motion. The structure and function of the guide members 51 and the slits 52 are substantially the same as those of the attachment as shown in FIGS. 15 and 16, and therefore, further detailed explanation thereon is omitted.

The mixer 10 with the attachment 50" has an effect that is derived from the embodiment as shown in FIGS. 8 to 16 (effect of the slits 52) and the effect that is to be obtained from the embodiment as shown in FIGS. 17 to 24 (effect of swirling flow in the conduit 46).

Figure 26:
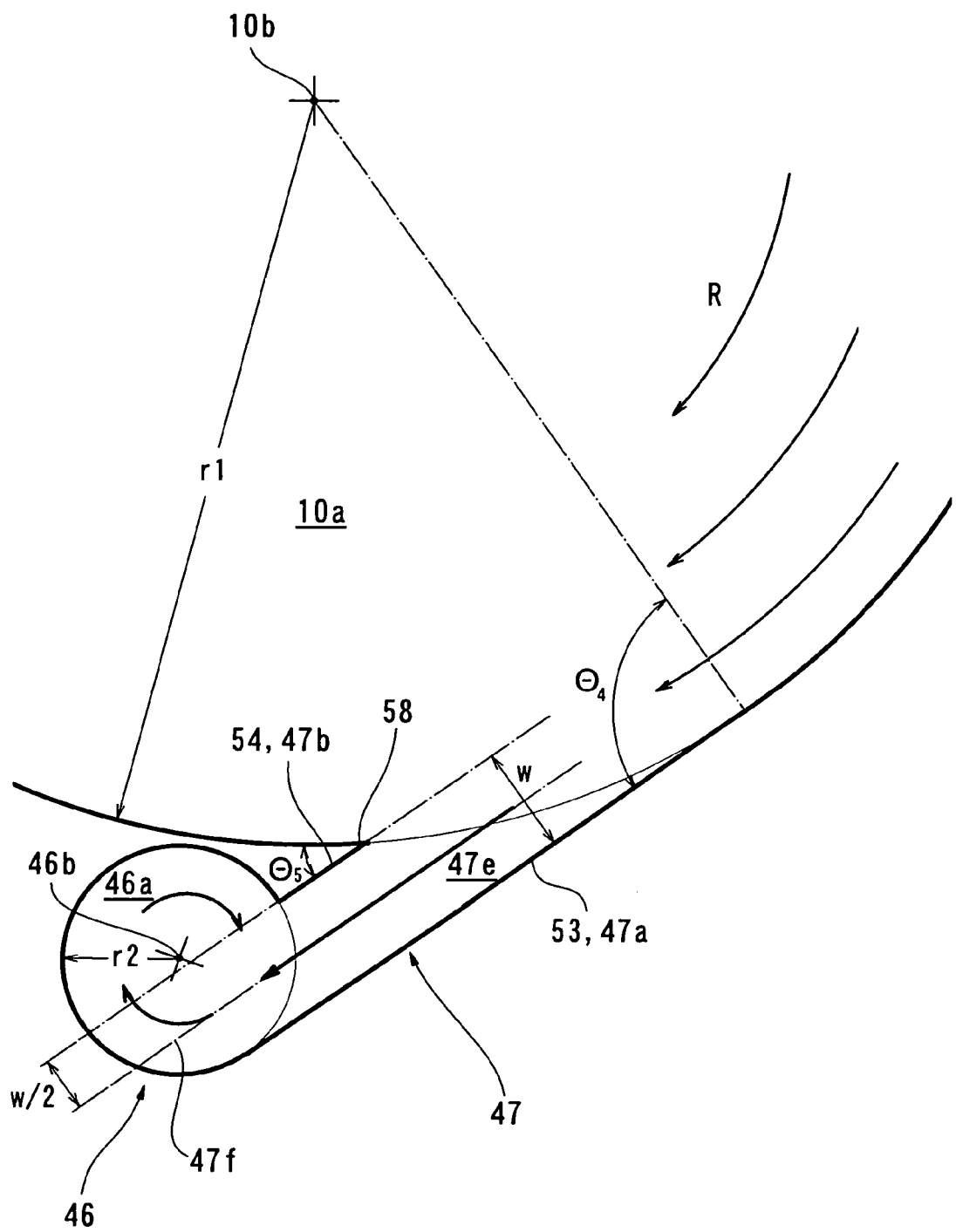
FIG. 26 is a schematic plan view which geometrically illustrates an alternate arrangement of the mixer as shown in FIGS. 17 to 22.

FIG. 26 is a schematic plan view which geometrically illustrates a modified arrangement of the embodiments shown in FIGS. 17 to 22. A positional relation among the area 10a, the section 47 and the conduit 46 is geometrically shown in FIG. 25.

In the aforementioned embodiment, the section 47 is connected to the conduit 46 eccentrically on the side of the wall 23. In the embodiment as shown in FIG. 26, however, the section 47 is connected to the conduit 46 in an eccentric position radially outward of the mixer 10 (on the side opposite to the wall 23). Therefore, swirling or turning force in the direction opposite to that of the aforementioned embodiment is given to the slurry entering the area 46a. The slurry swirls in a clockwise direction, similarly to the slurry in the mixer 10, so as to undergo the mixing and stirring action.

The present inventors have produced light-weight gypsum boards (Examples-1 to 6) which have a thickness of 9.5 mm, a width of 910 mm and a specific gravity of approximately 0.65. A mixer of the first embodiment (FIGS. 2 to 7) has been used for Example-1, a mixer of the second embodiment (FIGS. 8 to 10) has been used for Examples-2 and 3, and a mixer of the third embodiment (FIGS. 17 to 26) has been used for Examples-4, 5 and 6. Further, the present inventors have produced lightweight gypsum boards (Comparative Examples-1 to 5) which have a thickness of 9.5 mm, a width of 910 mm and a specific gravity of approximately 0.65, using a mixer with conventional structure. With respect to the mixed state of the foam in the slurry, the consumption of the foaming agent, and the production rate of the gypsum boards (i.e., the conveyance velocity V (FIG. 1) of the lower sheet of paper 1, the slurry 3 and the upper sheet of paper 2), the results of the tests of Examples-1 to 6 and Comparative Examples-1 to 5 are shown in the table of FIG. 27. The mixed state of the foam in the slurry is indicated as the observed results of core in FIG. 27. In an examination as to whether the mixed state is good or bad, broken-out sections of interface of the core and the liner paper in the produced gypsum boards have been evaluated by visual observation and photographic observation with use of an electron microscope, and then the mixed state of the foam in the slurry has been judged. Further, the effects of reduction in the consumption of the foaming agent have been indicated by numerical values, wherein the reference value (achievement index=100) falls under the reduced consumption in the example which represents the lowest consumption of foaming agent among all of the tests, and wherein each of the numerical values as per the effects of reduction in the consumption of the foaming agent is indicated by a ratio of the reduced consumption relative to that of the reference value. Therefore, the value shown in FIG. 27 means that the lower value indicates less reduction in the consumption of the foaming agent (i.e., more foaming agent is consumed).

EXAMPLE-1

The Mixer of the First Embodiment

The mixer 10 as shown in FIGS. 2 to 7 has been used for preparing gypsum slurry, and the foam has been mixed in the slurry by the foam feeding conduit 40 immediately before the slurry enters the slurry outlet port 45. The flow rate of slurry has been set to be 1 m³/minute, wherein the flow rate of slurry has been defined and measured as the volume of slurry/minute at the time of passing through the section of the forming rollers 18 (FIG. 1). The flow rate of slurry in the Examples and Comparative Examples as set forth below has been based on the same definition. Meanwhile, the slurry is somewhat dried and defoamed while moving from the slurry delivery conduit 46 to the rollers 18 (FIG. 1), and therefore, the volume of slurry/minute at the time of passing through the section of the rollers 18 is reduced by approximately 20%, in comparison with the volume of slurry/minute in the conduit 46. For instance, the volume of slurry/minute=1 m³/minute at the section of the rollers 18 corresponds to the volume of slurry/minute≈1.2 m³/minute in the conduit 46.

EXAMPLE-2

The Mixer of the Second Embodiment

The attachment 50 (FIGS. 8~10) has been attached to the slurry outlet port 45 in the mixer 10 of Example-1. The gypsum slurry has been prepared by this mixer 10 and the foam has been mixed into the slurry by the foam feeding conduit 40, immediately before the port 45.

EXAMPLE-3

The Mixer of the Second Embodiment

The gypsum slurry has been prepared by the same mixer as that of Example-2, and the foam has been mixed into the slurry by the conduit 40, immediately before the port 45. The flow rate of slurry has been set to be 1.5 m³/minute.

EXAMPLE-4

The Mixer of the Third Embodiment

The mixer 10 equipped with the attachment 50 as shown in FIG. 23 has been used for preparing gypsum slurry, and the foam has been mixed into the slurry by the conduit 40, immediately before flowing through the port 45. The slurry mixed with the foam has been brought into a streamline state within the section 47 and it has flowed into the conduit 46 to make a swirling flow in the conduit 46.

EXAMPLE-5

The Mixer of the Third Embodiment

The mixer 10 equipped with the attachment 50' as shown in FIG. 24 has been used for preparing gypsum slurry, and the foam has been mixed into the slurry within the slurry passage 47e by the conduit 40. The flow rate of slurry has been set to be 1.0 m³/minute.

EXAMPLE-6

The Mixer of the Third Embodiment

The mixer 10 equipped with the attachment 50" as shown in FIG. 25 has been used for preparing gypsum slurry, and the foam has been mixed in the slurry within the mixing area 10a by the conduit 40. The flow rate of slurry has been set to be 1.5 m³/minute.

COMPARATIVE EXAMPLE-1

The mixer of Comparative Example-1 has been used, which has been provided with the foam feeding port disposed in a center area of the upper plate (inward zone) and an attachment (with slits) similar to that of Examples-2 and 3 attached to the slurry outlet port. The slurry outlet port has been connected to the upper end portion of the slurry delivery conduit by means of the hollow connector section. In Examples-1 to 5, the foam has been fed to the slurry by the conduit 40 immediately before the slurry outlet port 45. In Comparative Example-1, however, the foam has been fed to the slurry in the center region of the mixer during preparation. The slurry with the foam mixed therein has been conducted through the slits of the slurry outlet port to the hollow connector section, and the slurry has been introduced through the slurry passage of the hollow connector section into a center of the slurry delivery conduit. The flow rate of slurry has been set to be 1.0 m³/minute.

COMPARATIVE EXAMPLE-2

The attachment has been removed from the mixer of Comparative Example-1 and the position of the foam feeding port has been changed to a peripheral zone of the upper plate with respect to the mixer of Comparative Example-1. This mixer has been used for preparing the slurry while feeding the foam to the peripheral zone of the mixer. The slurry and the foam have been conducted through the fully opened slurry outlet port to the hollow connector section and introduced into a center of the slurry delivery conduit through the slurry passage of the hollow connector section. The flow rate of slurry has been set to be 1.0 m³/minute.

COMPARATIVE EXAMPLE-3

The position of the foam feeding port has been changed to the slurry delivery conduit with respect to the mixer of Comparative Example-2 so as to prepare the slurry without mixing the foam into the slurry within the mixing area. The slurry before mixing of the foam has flowed through the fully opened slurry outlet port to the hollow connector section and then, entered into the center of the slurry delivery conduit, as in Comparative Examples-1 and 2. The foam has been fed to the slurry in the slurry delivery conduit. The flow rate of slurry has been set to be 1.0 m³/minute.

COMPARATIVE EXAMPLE-4

The mixer identical with that of Comparative Example-3 has been used for preparing the slurry. As in Comparative Example-3, the foam has been merely fed to the slurry in the slurry delivery conduit. The flow rate of slurry has been set to be 0.8 m³/minute.

COMPARATIVE EXAMPLE-5

The mixer identical with that of Comparative Example-3 has been used for preparing the slurry. As in Comparative Example-3, the foam has been merely fed to the slurry in the slurry delivery conduit. The flow rate of slurry has been set to be 0.6 m³/minute.

As is apparent from the results of the tests as shown in FIG. 27, in a case where the flow rate of slurry was set to be 1.0 m³/minute utilizing the mixer of Comparative Examples-1 to 3, the consumption of the foaming agent could not be desirably reduced (Comparative Examples-1 and 2) owing to a relatively large quantity of foam defoamed in the mixing area under influence of agitating and mixing; or otherwise, bulging occurred on the gypsum board (Comparative Example-3), since the foam was not uniformly mixed in the slurry. The latter problem was overcome by decreasing the flow rate of slurry down to 0.8 or 0.6 m³/minute as in Comparative Examples-4 and 5. However, in such a case, the production rate of gypsum boards were lowered down to approximately 90 or 70 m/minute (Comparative Examples-4 and 5). From these results, the following technical matters were clarified:

(i) The consumption of foaming agent cannot be sufficiently reduced by feeding the foam to the inward zone of the mixer, even if the attachment with the slits is provided on the slurry outlet port (Comparative Example-1);

(ii) In a condition that the slurry outlet port is fully opened and that the swirling flow of slurry in the conduit 46 is not used, the consumption of foaming agent cannot be sufficiently reduced, even if the foam is fed to the peripheral zone (Comparative Example-2); and (iii) Using the way of feeding the foam to the slurry delivery conduit, the consumption of foaming agent might be able to be reduced in accordance with reduction in the flow rate of slurry. However, only using this method, the mixer is not applicable to a high speed production of gypsum boards in which preparation of slurry at a relatively high flow rate (equal to or greater than 1 m³/minute) is required (Comparative Examples-3, 4 and 5).

On the other hand, according to the arrangement of the mixer 10 of the present invention, the consumption of foaming agent can be sufficiently reduced, even if the flow rate of slurry is set to be equal to or higher than 1.0 m³/minute. Further, the observed results of the core are desirable. That is, stable supply of slurry can be achieved with the foam being stirred and mixed therein in a good condition. In addition, the production rate of gypsum boards can be set to be at a high rate equal to or higher than 115 m/minute, by the mixer 10 according to the present invention. Thus, the mixer 10 of the present invention can achieve reduction in the consumption of foam, and further, the mixer 10 is applicable to a high speed production method of gypsum boards to which the conventional mixer was not applicable, thereby contributing to improvement of productivity of the gypsum boards.

Although the present invention has been described as to preferred embodiments and examples, the present invention is not limited thereto, but may be carried out in any of various modifications or variations without departing from the scope of the invention as defined in the accompanying claims.

For instance, the arrangement of the mixer according to the present invention can be equally applied to a mixer other than the pin type of mixer (e.g., a pinless mixer such as a vane-type mixer), or a mixer with a rotary disc which is not provided with the tooth configurations on its periphery.

Further, the transverse cross-section of the fluid passage in the slurry delivery conduit is not limited to a round configuration, but it may be elliptic or oval.

Furthermore, the purpose of use of the mixer according to the present invention is not limited to that of a mixer for producing gypsum boards, but it can be used, in other fields, as a mixer for solid material such as powder, liquid and foam.

INDUSTRIAL APPLICABILITY

The present invention is applicable to a mixer and a mixing method, especially a mixer and a mixing method used for a process of producing gypsum boards. The present mixer and mixing method enables reduction in the consumption of foaming agent for the process of producing gypsum boards, and speeding up of the gypsum board production line. Therefore, the present invention can be preferably applied to a method of producing gypsum boards where a high speed production rate is required.

The invention claimed is:

1. A mixer comprising a flattened and circular housing provided with an annular wall on its periphery;
   a rotary disc located in the housing to rotate in a predetermined rotational direction;
   a slurry outlet port opening on said annular wall to discharge from the housing, gypsum slurry mixed in the housing;
   a hollow connector section with an open end connected to said slurry outlet port and another open end connected to a substantially vertical and cylindrical slurry delivery conduit;
   a foam feeding port for feeding foam to the gypsum slurry, and
   an attachment having said slurry outlet port, said hollow connector section and said slurry delivery conduit detachably mounted on said annular wall,
   wherein said foam feeding port is provided on the annular wall on an upstream side of the slurry outlet port in the rotational direction so as to feed the foam to the gypsum slurry immediately before the gypsum slurry enters said slurry outlet port, or provided on said hollow connector section so as to feed the foam to the gypsum slurry flowing in the hollow connector section.

2. The mixer as defined in claim 1, wherein said slurry delivery conduit is provided with its inside area having a circular transverse cross-section, and said hollow connector section is connected to the slurry delivery conduit in a position eccentric to a center axis of the slurry delivery conduit, whereby the gypsum slurry swirls in said inside area.

3. The mixer as defined in claim 2, wherein said hollow connector section is connected to said slurry delivery conduit so as to cause the gypsum slurry to flow thereinto in a tangential direction of said inside area.

4. The mixer as defined in claim 2, wherein said hollow connector section is connected to said slurry delivery conduit in a position eccentric to the center axis of the slurry delivery conduit, so that the gypsum slurry in said inside area swirls in the same direction opposite to the rotational direction of said disc.

5. The mixer as defined in claim 2, wherein said hollow connector section is connected to said slurry delivery conduit in a position eccentric to the center axis of the slurry delivery conduit, so that the gypsum slurry in said inside area swirls in the same direction as the rotational direction of said disc.

6. The mixer as defined in claim 2, wherein said slurry outlet port is provided with a plurality of blades which impose shearing force on the slurry flowing through the slurry outlet port, and said blades form a plurality of slits in the slurry outlet port.

7. The mixer as defined in claim 6, wherein said slurry outlet port causes the gypsum slurry to flow into said hollow connector section in a tangential direction with respect to said annular wall.

8. The mixer as defined in claim 6, wherein said slits are formed by said blades having a thickness (t) ranging from 1 mm to 5 mm, which are arranged at equal intervals, and a fluid passage dimension (h, w) of said slit between said blades is set to be in a range from 4 mm to 15 mm.

9. The mixer as defined in claim 6, wherein said blades are positioned horizontally or vertically.

10. The mixer as defined in claim 6, wherein said hollow connector section has wall surfaces (47$a$, 47$b$) on sides upstream and downstream in the rotational direction, these wall surfaces forming a slurry passage in said hollow connector section, and said wall surface (47$a$) on the upstream side is oriented at an angle ranging from 90° to 120° with respect to a normal line (G) of said housing.

11. A method of producing gypsum boards with use of the mixer as defined in claim 2, wherein gypsum boards having a thickness of 9.5 mm and a width of 910 mm are produced at a production rate equal to or higher than 110 m$^3$/minute.

12. A method of producing gypsum boards with use of the mixer as defined in claim 2, wherein the gypsum slurry at a flow rate equal to or higher than 1 m$^3$/minute is fed between sheets of paper for gypsum board liner passing through forming means.

13. The mixer as defined in claim 1, wherein said slurry outlet port is provided with a plurality of blades which impose shearing force on the slurry flowing through the slurry outlet port, and said blades form a plurality of slits in the slurry outlet port.

14. The mixer as defined in claim 13, wherein said slits are formed by said blades having a thickness (t) ranging from 1 mm to 5 mm, which are arranged at equal intervals, and a fluid passage dimension (h, w) of said slit between said blades is set to be in a range from 4 mm to 15 mm.

15. The mixer as defined in claim 13, wherein said blades are positioned horizontally or vertically.

16. The mixer as defined in claim 1, wherein said slurry outlet port causes the gypsum slurry to flow into said hollow connector section in a tangential direction with respect to said annular wall.

17. The mixer as defined in claim 1, wherein said hollow connector section has wall surfaces (47$a$, 47$b$) on sides upstream and downstream in the rotational direction, these wall surfaces forming a slurry passage in said hollow connector section, and said wall surface (47$a$) on the upstream side is oriented at an angle ranging from 90° to 120° with respect to a normal line (G) of said housing.

18. The mixer as defined in claim 17, wherein said foam feeding port is disposed on said wall surface (47$a$) on the upstream side.

19. The mixer as defined in claim 17, wherein said wall surfaces (47$a$, 47$b$) on the upstream and downstream sides are parallel with each other.

20. The mixer as defined in claim 17, wherein said wall surface (47$b$) on the downstream side is positioned at a sharp angle relative to a circumferential inside surface of said annular wall so as to prevent the gypsum slurry in the slurry passage of said hollow connector section from flowing backward or returning into said housing.

21. A method of mixing gypsum slurry with use of a mixer as defined in claim 1, comprising:
- a first mixing step of mixing powder material and water, which are fed into said housing, in a mixing area within said housing with rotation of said disc to prepare the slurry; and
- a second mixing step of feeding the foam to the gypsum slurry from the foam feeding port, and imposing shearing force on the slurry and the foam at said slurry outlet port or on its downstream side so as to mix the slurry and the foam.

22. The method as defined in claim 21, wherein the foam is fed to the gypsum slurry immediately before or immediately after the slurry flows through said slurry outlet port, and fluid of the slurry and the foam eccentric to an inside area of said slurry delivery conduit having a circular transverse cross-section is induced to enter said inside area in a tangential direction thereof, so that the slurry and the foam are induced to swirl in said inside area and they are mixed with each other by shearing force acting on the slurry during swirling.

23. The method as defined in claim 21, wherein a plurality of blades forming a plurality of slits are disposed in said slurry outlet port, and the foam is fed to the slurry immediately before the slurry passes through said slits so as to cause the slurry and the foam to mix with each other by shearing force acting on the slurry passing through the slits.

24. The method as defined in claim 21, wherein a plurality of blades forming a plurality of slits are disposed in said slurry outlet port, the foam is fed to the slurry immediately before the slurry passes through said slits so as to cause the slurry and the foam to mix with each other by shearing force acting on the slurry passing through the slits, and fluid of the slurry and the foam eccentric to an inside area of said slurry delivery conduit having a circular transverse cross-section is induced to enter the inside area in a tangential direction thereof, so that the slurry and the foam are induced to swirl in said inside area and they are further mixed with each other by shearing force acting on said slurry during swirling.

25. The method as defined in claim 21, wherein the gypsum slurry in a peripheral zone of said mixing area is induced to flow into said hollow connector section through said slurry outlet port in a tangential direction of said annular wall.

26. A method of producing gypsum boards with use of the mixer as defined in claim 1, wherein gypsum boards having a thickness of 9.5 mm and a width of 910 mm are produced at a production rate equal to or higher than 110 m³/minute.

27. A method of producing gypsum boards with use of the mixer as defined in claim 1, wherein the gypsum slurry at a flow rate equal to or higher than 1 m³/minute is fed between sheets of paper for gypsum board liner passing through forming means.

28. A mixer comprising a flattened and circular housing provided with an annular wall on its periphery;
- a rotary disc located in the housing to rotate in a predetermined rotational direction;
- a slurry outlet port opening on said annular wall to discharge from the housing, gypsum slurry mixed in the housing;
- a hollow connector section with an open end connected to said slurry outlet port and another open end connected to a substantially vertical and cylindrical slurry delivery conduit; and
- a foam feeding port for feeding foam to the gypsum slurry,
- wherein said foam feeding port is provided on the annular wall on an upstream side of the slurry outlet port in the rotational direction so as to feed the foam to the gypsum slurry immediately before the gypsum slurry enters said slurry outlet port;
- wherein an angle ($\theta_2$), around a center axis of the disc between a center of said foam feeding port and an edge portion (J) of said slurry outlet port on the upstream side in the rotational direction is set to be in a range from 0° to 30°; and
- wherein said slurry outlet port is provided with a plurality of blades, which impose shearing force on the slurry flowing through the slurry outlet port and which form a plurality of slits in the slurry outlet port.

29. The mixer as defined in claim 28, wherein said slurry delivery conduit is provided with its inside area having a circular transverse cross-section, and said hollow connector section is connected to the slurry delivery conduit in a position eccentric to a center axis of the slurry delivery conduit, whereby the gypsum slurry swirls in said inside area.

30. The mixer as defined in claim 29, wherein said hollow connector section is connected to said slurry delivery conduit so as to cause the gypsum slurry to flow thereinto in a tangential direction of said inside area.

31. The mixer as defined in claim 29, wherein said hollow connector section is connected to said slurry delivery conduit in a position eccentric to the center axis of the slurry delivery conduit, so that the gypsum slurry in said inside area swirls in a direction opposite to the rotational direction of said disc.

32. The mixer as defined in claim 29, wherein said hollow connector section is connected to said slurry delivery conduit in a position eccentric to the center axis of the slurry delivery conduit, so that the gypsum slurry in said inside area swirls in the same direction as the rotational direction of said disc.

33. The mixer as defined in claim 28, wherein said slurry outlet port causes the gypsum slurry to flow into said hollow connector section in a tangential direction with respect to said annular wall.

34. The mixer as defined in claim 28, wherein said slits are formed by said blades having a thickness (t) ranging from 1 mm to 5 mm, which are arranged at equal intervals, and a fluid passage dimension (h, w) of said slit between said blades is set to be in a range from 4 mm to 15 mm.

35. The mixer as defined in claim 28, wherein said blades are positioned horizontally or vertically.

36. The mixer as defined in claim 28, wherein said hollow connector section has wall surfaces (47a, 47b) on sides upstream and downstream in the rotational direction, these wall surfaces forming a slurry passage in said hollow connector section, and said wall surface (47a) on the upstream side is oriented at an angle ranging from 90° to 120° with respect to a normal line (G) of said housing.

37. The mixer as defined in claim 36, wherein said wall surfaces (47a, 47b) on the upstream and downstream sides are parallel with each other.

38. The mixer as defined in claim 36, wherein said wall surface (47b) on the downstream side is positioned at a sharp angle relative to a circumferential inside surface of said annular wall so as to prevent the gypsum slurry in the slurry passage of said hollow connector section from flowing backward or returning into said housing.

39. A method of mixing gypsum slurry with use of a mixer as defined in claim 28, comprising:
- a first mixing step of mixing powder material and water, which are fed into said housing, in a mixing area within said housing with rotation of said disc to prepare the gypsum slurry; and
- a second mixing step of feeding the foam to the gypsum slurry immediately before the slurry passes through said slits so as to cause the slurry and the foam to mix with each other by shearing force acting on the slurry passing through the slits.

40. The method as defined in claim 39, wherein the gypsum slurry in a peripheral zone of said mixing area is induced to flow into said hollow connector section through said slurry outlet port in a tangential direction of said annular wall.

41. A method of producing gypsum boards with use of the mixer as defined in claim 28, wherein gypsum boards having a thickness of 9.5 mm and a width of 910 mm are produced at a production rate equal to or higher than 110 m/minute.

42. A method of producing gypsum boards with use of the mixer as defined in claim 28, wherein the gypsum slurry at a flow rate equal to or higher than 1 $m^3$/minute is fed between sheets of paper for gypsum board liner passing through forming means.

* * * * *